United States Patent
Ikebuchi

(10) Patent No.: US 10,817,160 B2
(45) Date of Patent: Oct. 27, 2020

(54) THREE-DIMENSIONAL COORDINATE MEASURING DEVICE

(71) Applicant: Keyence Corporation, Osaka (JP)

(72) Inventor: Masayasu Ikebuchi, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 16/448,318

(22) Filed: Jun. 21, 2019

(65) Prior Publication Data

US 2020/0042161 A1 Feb. 6, 2020

(30) Foreign Application Priority Data

Aug. 1, 2018 (JP) ................. 2018-145464

(51) Int. Cl.
| | |
|---|---|
| *G06F 3/0484* | (2013.01) |
| *G06T 7/70* | (2017.01) |
| *G06F 3/0482* | (2013.01) |
| *G01B 11/00* | (2006.01) |
| *G06F 3/14* | (2006.01) |
| *G06F 3/041* | (2006.01) |

(52) U.S. Cl.
CPC ........ *G06F 3/04847* (2013.01); *G01B 11/007* (2013.01); *G06F 3/0482* (2013.01); *G06F 3/1423* (2013.01); *G06T 7/70* (2017.01); *G06F 3/041* (2013.01); *G06T 2200/24* (2013.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 5,418,730 | A | * 5/1995 | Mariani | ................. G01B 5/008 33/505 |
| 9,551,566 | B2 | 1/2017 | Wakai | |
| 9,557,159 | B2 | 1/2017 | Ikebuchi | |
| 9,778,023 | B2 | 10/2017 | Osaki et al. | |

(Continued)

FOREIGN PATENT DOCUMENTS

JP 2015-194452 A 11/2015

OTHER PUBLICATIONS

U.S. Appl. No. 16/448,303, filed Jun. 21, 2019 (87 pages).

*Primary Examiner* — Amy M Levy
(74) *Attorney, Agent, or Firm* — Kilyk & Bowersox, P.L.L.C.

(57) ABSTRACT

To provide a three-dimensional coordinate measuring device having high convenience with respect to setting of measurement conditions. A geometric element and a measurement item selected on a first main screen sc01 are accepted. A first sub screen sc11 including a part of the plurality of geometric elements and the plurality of measurement items displayed on the first main screen sc01 is displayed on a touch panel display 230 provided in a handheld probe. Based on an operation of the touch panel display 230, a geometric element and a measurement item are selected from the displayed first sub screen sc11. Base on the geometric element and the measurement item accepted by at least one of the main accepting unit and a sub accepting unit and the coordinates of a measurement point instructed by the handheld probe, the value of the selected measurement item of the selected geometric element is calculated.

9 Claims, 25 Drawing Sheets

(56) References Cited

U.S. PATENT DOCUMENTS

| | | | |
|---|---|---|---|
| 9,885,564 B2 | 2/2018 | Osaki et al. | |
| 10,267,620 B2 | 4/2019 | Ikebuchi | |
| 2002/0156597 A1* | 10/2002 | Kornowski, Jr. | G01B 21/04 702/179 |
| 2012/0144685 A1* | 6/2012 | Atwell | G05B 23/0216 33/503 |
| 2014/0012409 A1* | 1/2014 | McMurtry | G05B 19/402 700/180 |
| 2015/0253125 A1* | 9/2015 | Pettersson | G06T 19/006 715/771 |
| 2015/0276389 A1* | 10/2015 | Osaki | G01B 9/00 348/136 |
| 2015/0345932 A1* | 12/2015 | Wakai | G01B 21/047 33/503 |
| 2017/0108324 A1* | 4/2017 | Abe | G01B 5/008 |
| 2017/0314911 A1 | 11/2017 | Futami | |

\* cited by examiner

FIG. 17

| | MAIN BODY MEMORY | PROBE MEMORY |
|---|---|---|
| SELECTION OPERATION OF GEOMETRIC ELEMENT SELECTION OPERATION OF MEASUREMENT ITEM | FIRST MAIN SCREEN GENERATION DATA | FIRST SUB SCREEN GENERATION DATA |
| INSTRUCTION OPERATION OF MEASUREMENT POINT SETTING OPERATION OF MEASUREMENT TARGET PORTION | SECOND MAIN SCREEN GENERATION DATA | SECOND SUB SCREEN GENERATION DATA |
| SELECTION OPERATION OF MEASUREMENT TARGET PORTION | THIRD MAIN SCREEN GENERATION DATA | THIRD SUB SCREEN GENERATION DATA |
| SELECTION OPERATION OF GEOMETRIC TOLERANCE | FOURTH MAIN SCREEN GENERATION DATA | FOURTH SUB SCREEN GENERATION DATA |

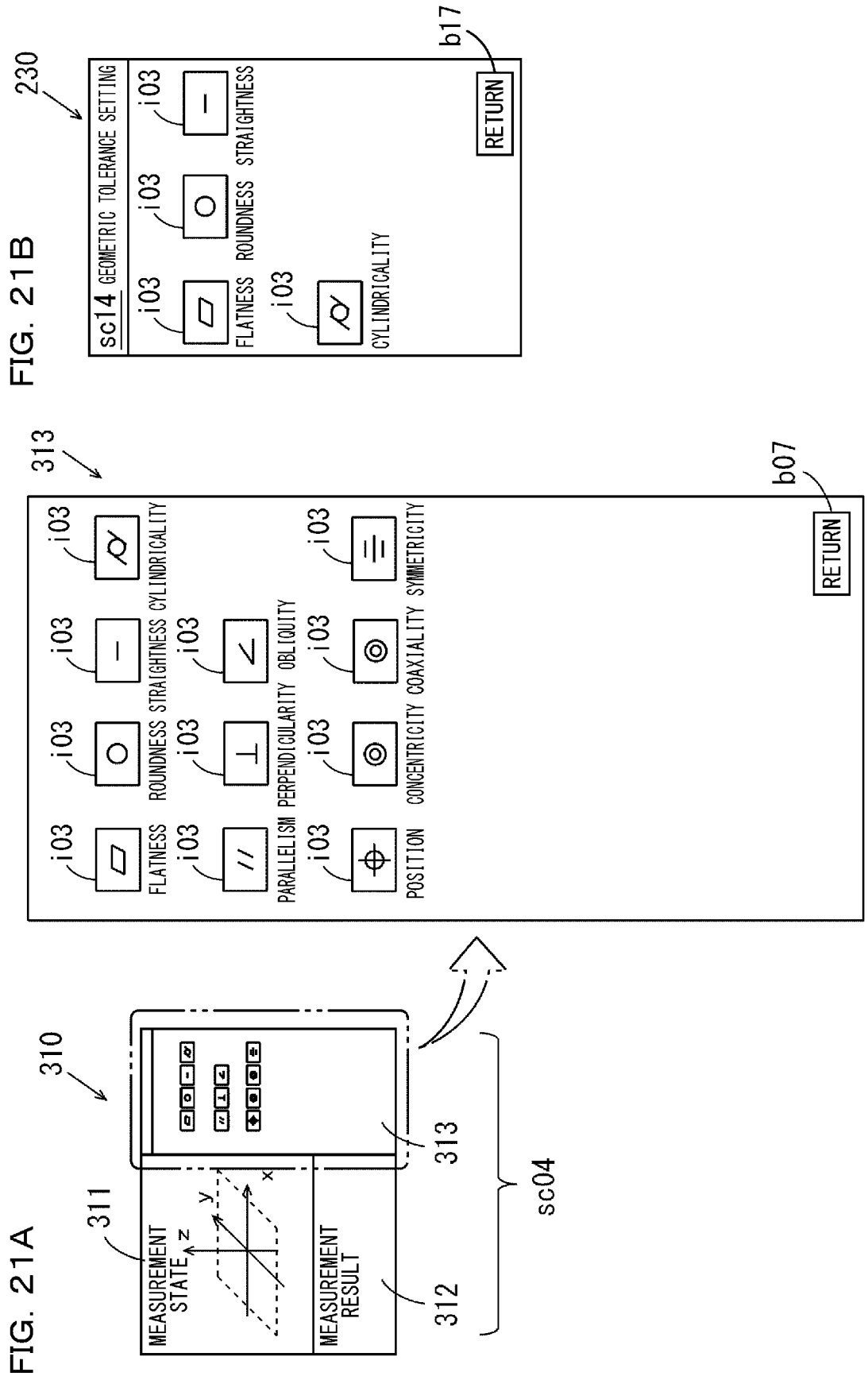

THREE-DIMENSIONAL COORDINATE MEASURING DEVICE

CROSS-REFERENCE TO RELATED APPLICATIONS

The present application claims foreign priority based on Japanese Patent Application No. 2018-145464, filed Aug. 1, 2018, the contents of which is incorporated herein by reference.

BACKGROUND OF THE INVENTION

1. Field of the Invention

The present invention relates to a three-dimensional coordinate measuring device using a contact-type probe.

2. Description of Related Art

A contact-type three-dimensional coordinate measuring device is provided with a probe having a contact part. The contact part of the probe is brought into contact with a measurement target and the contact position between the measurement target and the contact part is calculated. The dimensions of a desired part of the measurement target are measured by calculating a plurality of positions on the measurement target.

An optical coordinate measuring device described in JP-A-2015-194452 as one example of a three-dimensional coordinate measuring device includes a mounting table, a probe, and an imaging unit.

The contact part of the probe is brought into contact with the measurement target placed on the mounting table. An imaging unit generates image data by capturing a plurality of markers provided on the probe. The coordinates of the contact position between the measurement target and the contact part are calculated based on the image data. The dimensions of individual portions of the measurement target are measured using the calculated coordinates.

In the optical coordinate measuring device described above, a display unit and an operation unit are provided in a holding section that holds the imaging unit. The user sets measurement conditions as to how to measure which portion of the measurement target by operating the operation unit while visually checking the information displayed on the display unit.

When the dimensions of individual portions of a large measurement target exceeding the mounting table are measured, since the measurement target cannot be mounted on the mounting table, the distance between the position in which the display unit and the operation unit are present and the position in which the measurement target is present is large. In this case, the setting of the measurement conditions and the operation for bringing the contact part of the probe into contact with the measurement target cannot be performed in the same position. Therefore, when alternately setting the measurement conditions and operating the probe, the user needs to move between the position in which the display unit and the operation unit are present and the position in which the measurement target is present. As described above, the measurement of the measurement target accompanied by the movement for each operation is troublesome and takes a long time.

SUMMARY OF THE INVENTION

An object of the invention is to provide a three-dimensional coordinate measuring device having high convenience with respect to the setting of measurement conditions.

(1) A three-dimensional coordinate measuring device according to the invention includes a handheld probe that has a plurality of measurement markers and instructs one or more measurement points on a measurement target; an imaging unit that captures the plurality of measurement markers of the handheld probe; a coordinate calculation unit that calculates coordinates of the one or more measurement points instructed by the handheld probe based on marker image data indicating an image of the plurality of measurement markers captured by the imaging unit; a main setting screen generation unit that generates main setting screen data indicating a main setting screen including a plurality of predetermined geometric elements and a plurality of predetermined measurement items as a main setting information group; a main accepting unit that accepts one of the geometric elements and one of the measurement items selected on the main setting screen displayed based on the main setting screen data; a sub setting screen generation unit that generates sub setting screen data indicating a sub setting screen including a part of the main setting information group as a sub setting information group; a display unit that displays the sub setting screen based on the generated sub setting screen data; an operation unit that is operated by a user to select one of the geometric elements and one of the measurement items from the sub setting screen displayed in the display unit; a sub accepting unit that accepts the geometric element and the measurement item selected by the operation unit on the sub setting screen displayed in the display unit; and a measurement unit that calculates a value of the selected measurement item of the selected geometric element specified by the one or more measurement points on the measurement target based on the geometric element and the measurement item accepted by at least one of the main accepting unit and the sub accepting unit and the coordinates of the one or more measurement points calculated by the coordinate calculation unit, in which the handheld probe, the display unit, and the operation unit are configured to be portable.

In the three-dimensional coordinate measuring device, the one or more measurement points on the measurement target are instructed by the handheld probe and the plurality of measurement markers of the handheld probe are captured by the imaging unit. The coordinates of the one or more measurement points instructed by the handheld probe are calculated based on the marker image data obtained by the capturing.

The main setting screen data indicating the main setting screen including the main setting information group is generated. The geometric element and the measurement item selected on the main setting screen displayed based on the main setting screen data are accepted by the main accepting unit.

Sub setting screen data indicating the sub setting screen including the sub setting information group is generated. The sub setting screen is displayed in the display unit based on the sub setting screen data. The geometric element and the measurement item are selected from the displayed sub setting screen based on an operation of the operation unit by the user. The selected geometric element and measurement item are accepted by the sub accepting unit.

The value of the selected measurement item of the selected geometric element is calculated based on the geometric element and the measurement item received by at least one of the main accepting unit and the sub accepting unit and the calculated coordinates of one or more measurement points.

In the above structure, the user can select a desired geometric element and measurement item from the main setting information group including the plurality of predetermined geometric elements and measurement items on the main setting screen.

On the other hand, the user can select a desired geometric element and measurement item from the sub setting information group including a part of the main setting information group on the sub setting screen. Here, the handheld probe, the display unit, and the operation unit are configured to be carriable by the user. Accordingly, when selecting the geometric element and the measurement item from the sub setting information group, the user does not need to perform the instruction work of measurement points by the probe and the selection work of the geometric element and the measurement item in different positions. Accordingly, the setting work concerning measurement can be easily performed in a short time.

As described above, the user can selectively use the screens for setting between the main setting screen and the sub setting screen according to the measurement item and the geometric element to be set. Accordingly, the three-dimensional coordinate measuring device having large convenience large convenience with respect to the setting of measurement conditions can be achieved.

(2) Preferably, the display unit and the operation unit are provided in the probe.

In this case, it is possible to prevent individual members from being lost because the display unit, the operation unit, and the probe are not used separately from each other.

(3) Preferably, the display unit and the operation unit are formed by a touch panel display.

In this case, the user can easily select the geometric element and the measurement item by operating the touch panel display.

(4) Preferably, the sub setting screen includes one or more geometric images indicating the one or more geometric elements of the sub setting information group respectively and includes one or more item images indicating the one or more measurement items of the sub setting information group respectively and the operation unit is configured to be able to select the geometric element and the measurement item by selection from the one or more geometric images and the one or more item images on the sub setting screen.

In this case, the user can intuitively select the geometric element and the measurement item on the sub setting screen by operating the operation unit.

(5) Preferably, the main accepting unit accepts the geometric element and the measurement item selected on the sub setting screen in synchronization with acceptance of the geometric element and measurement item of the sub setting information group by the sub accepting unit and the sub accepting unit accepts the geometric element and the measurement item selected on the main setting screen in synchronization with acceptance of the geometric element and measurement item of the sub setting information group by the main accepting unit.

In this case, when the geometric element and the measurement item of the sub setting information group are selected in one of the main accepting unit and the sub accepting unit, the same geometric element and measurement item are accepted also in the other accepting unit. Accordingly, with respect to the selection of the geometric elements and the measurement items of the sub setting information group, the setting accepted by the main accepting unit can be prevented from differing from the setting accepted by the sub accepting unit.

(6) Preferably, the three-dimensional coordinate measuring device further includes a main measurement screen generation unit that is connected to an external device having a display function and, when the measurement unit calculates the value of the selected measurement item, generates main measurement screen data indicating a main measurement result screen including the calculated value of the measurement item; a sub measurement screen generation unit that generates sub measurement screen data indicating a sub measurement result screen including the calculated value of the selected measurement item when the measurement unit calculates the value of the selected measurement item; and a synchronous display control unit that causes the external device to display the main setting screen based on the main setting screen data, causes the display unit to display the sub setting screen based on the sub setting screen data, causes the external device to display the main measurement result screen based on the main measurement screen data, and causes the display unit to display the sub measurement result screen based on the sub measurement screen data.

In this case, the display of the main setting screen and sub setting screen on the external device and the display unit is synchronized and the display of the main measurement result screen and the sub measurement result screen on the external device and the display unit is synchronized. Accordingly, the user can appropriately grasp the information corresponding to the setting work of measurement conditions and the measurement work by visually checking the screen displayed on one of the external device and the display unit.

(7) Preferably, the three-dimensional coordinate measuring device further includes a main geometric tolerance screen generation unit that generates main geometric tolerance screen data indicating a main geometric tolerance screen including a plurality of predetermined geometric tolerances; and a sub geometric tolerance screen generation unit that generates sub geometric tolerance screen data indicating a sub geometric tolerance screen indicating a part of the plurality of geometric tolerances, in which the main accepting unit is configured to be able to accept one of the geometric tolerances that is selected on the main geometric tolerance screen displayed based on the main geometric tolerance screen data, the sub accepting unit is configured to be able to accept one of the geometric tolerances that is selected on the sub geometric tolerance screen displayed based on the sub geometric tolerance screen data, the measurement unit is configured to be able to calculate a value of the selected geometric tolerance specified by the one or more measurement points on the measurement target, and the synchronous display control unit causes the external device to display the main geometric tolerance screen based on the main geometric tolerance screen data and causes the display unit to display the sub geometric tolerance screen based on the sub geometric tolerance screen data.

In this case, the user can select a desired geometric tolerance to be calculated on the main geometric tolerance screen from the plurality of predetermined geometric tolerances. In addition, the user can select a desired geometric tolerance to be calculated on the sub geometric tolerance screen from a part of the plurality of predetermined geometric tolerances.

The display of the main geometric tolerance screen and the sub geometric tolerance screen on the external device and the display unit is synchronized. Accordingly, the user can appropriately grasp the information necessary for the setting work of the geometric tolerance by visually checking the screen displayed on one of the external device and the display unit.

According to the invention, a three-dimensional coordinate measuring device having large convenience with respect to the setting of measurement conditions is achieved.

BRIEF DESCRIPTION OF THE DRAWINGS

FIG. 17 illustrates the relationship between main screen generation data and sub screen generation data stored in a main body memory in FIG. 2 and a probe memory in FIG. 8, respectively, and an operation of the three-dimensional coordinate measuring device by a user;

FIGS. 21A-21B illustrates display examples of a fourth main screen and a fourth sub screen displayed on the main body display unit in FIG. 2 and the touch panel display in FIG. 8 at the time of a selection operation of a geometric tolerance;

DESCRIPTION OF EMBODIMENTS

Figure 1:
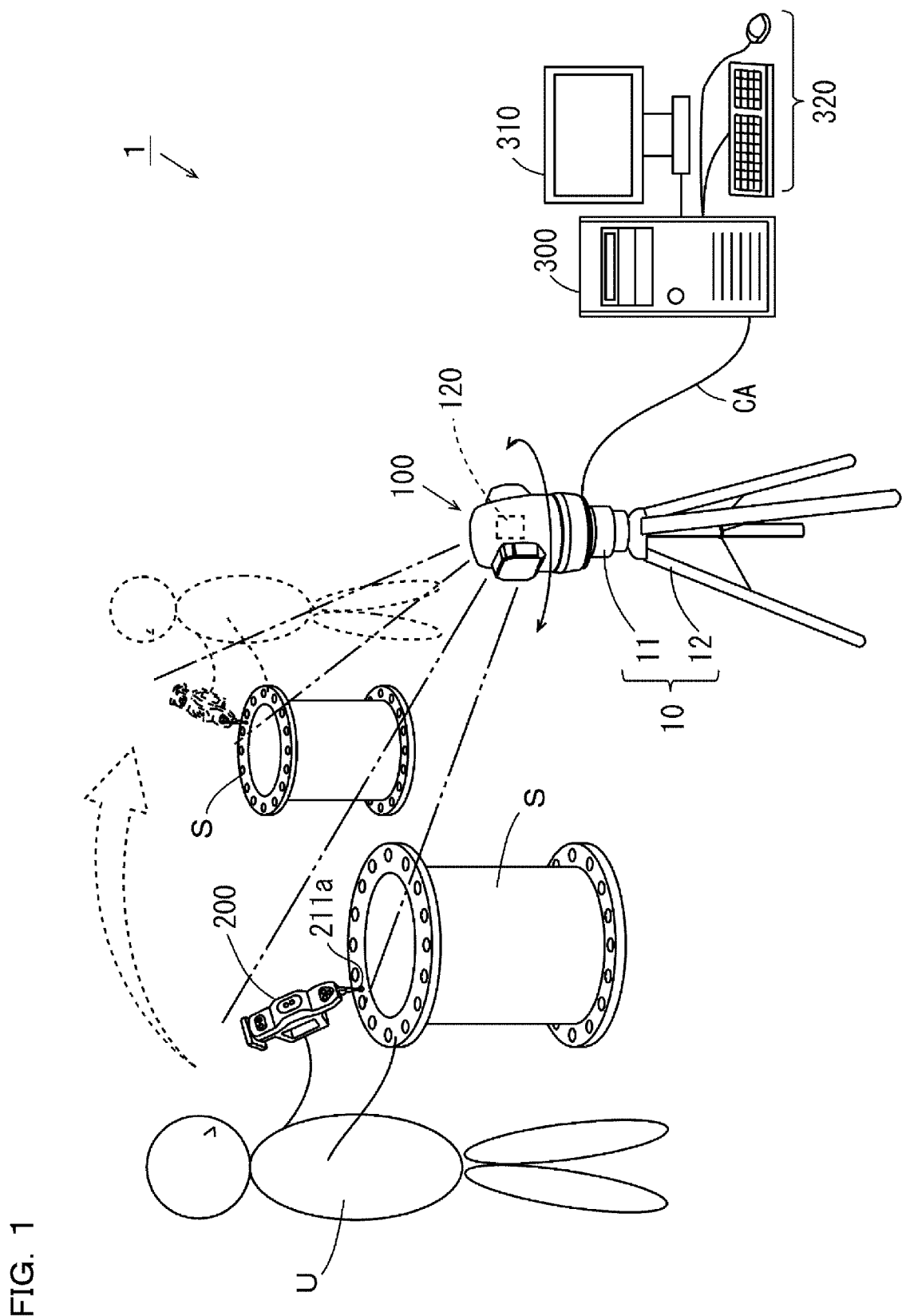
FIG. 1 is a schematic view illustrating an example of use of a three-dimensional coordinate measuring device according to an embodiment of the invention.

[1] Basic Structure and Example of Use of a Three-Dimensional Coordinate Measuring Device FIG. 1 is a schematic view illustrating an example of use of a three-dimensional coordinate measuring device according to an embodiment of the invention. As illustrated in FIG. 1, a three-dimensional coordinate measuring device 1 according to the embodiment of the invention mainly includes an imaging head 100, a probe 200, and a processing device 300 and is used to measure, for example, physical quantities such as the dimensions of portions of a large measurement target S. In the example in FIG. 1, a large pipe is illustrated as the measurement target S. The measurement target S is placed on a floor surface.

The probe 200 is carried by a user U. The probe 200 has a contact part 211a. The user U brings the contact part 211a of the probe 200 into contact with a desired portion of the measurement target S. The portion of the measurement target S that makes contact with the contact part 211a is a measurement point.

The imaging head 100 is fixed by a reference stand 10 to, for example, the floor surface as an installation surface. A movable camera 120 is provided in the imaging head 100. The movable camera 120 captures a plurality of markers eq (FIG. 9), which will be described later, provided on the probe 200. The reference stand 10 is a tripod stand and includes a fixing section 11 and a leg section 12. The fixing section 11 has a flat upper surface. The reference stand 10 is configured to enable posture adjustment between the fixing section 11 and the leg section 12 so that the upper surface of the fixing section 11 is fixed horizontally. The upper surface of the fixing section 11 is assumed to be fixed horizontally in the following description.

In addition, the imaging head 100 is connected to the processing device 300 via a cable CA. The processing device 300 is, for example, a personal computer to which a main body display unit 310 and a main body operation unit 320 are connected. In the processing device 300, the coordinates of a measurement point on the measurement target S are calculated based on the image data (referred to below as measurement image data) obtained by capturing the probe 200 using the movable camera 120 and reference image data described later. The coordinates of one or more measurement points on the measurement target S are calculated and, based on the calculation result, the physical quantities of the measurement target S are measured.

When the user U moves while carrying the probe 200, as illustrated in FIG. 1 by the dotted line arrow, the orientation of the imaging visual field of the movable camera 120 follows the movement of the probe 200. That is, the orientation of the movable camera 120 changes so that the probe 200 is positioned within the imaging visual field of the movable camera 120 when the probe 200 moves. Accordingly, the three-dimensional coordinate measuring device 1 has a wide measurable area. The structures of individual portions of the three-dimensional coordinate measuring device 1 will be described in detail below.

[2] Structures of the Imaging Head 100 and the Processing Device 300

Figure 2:
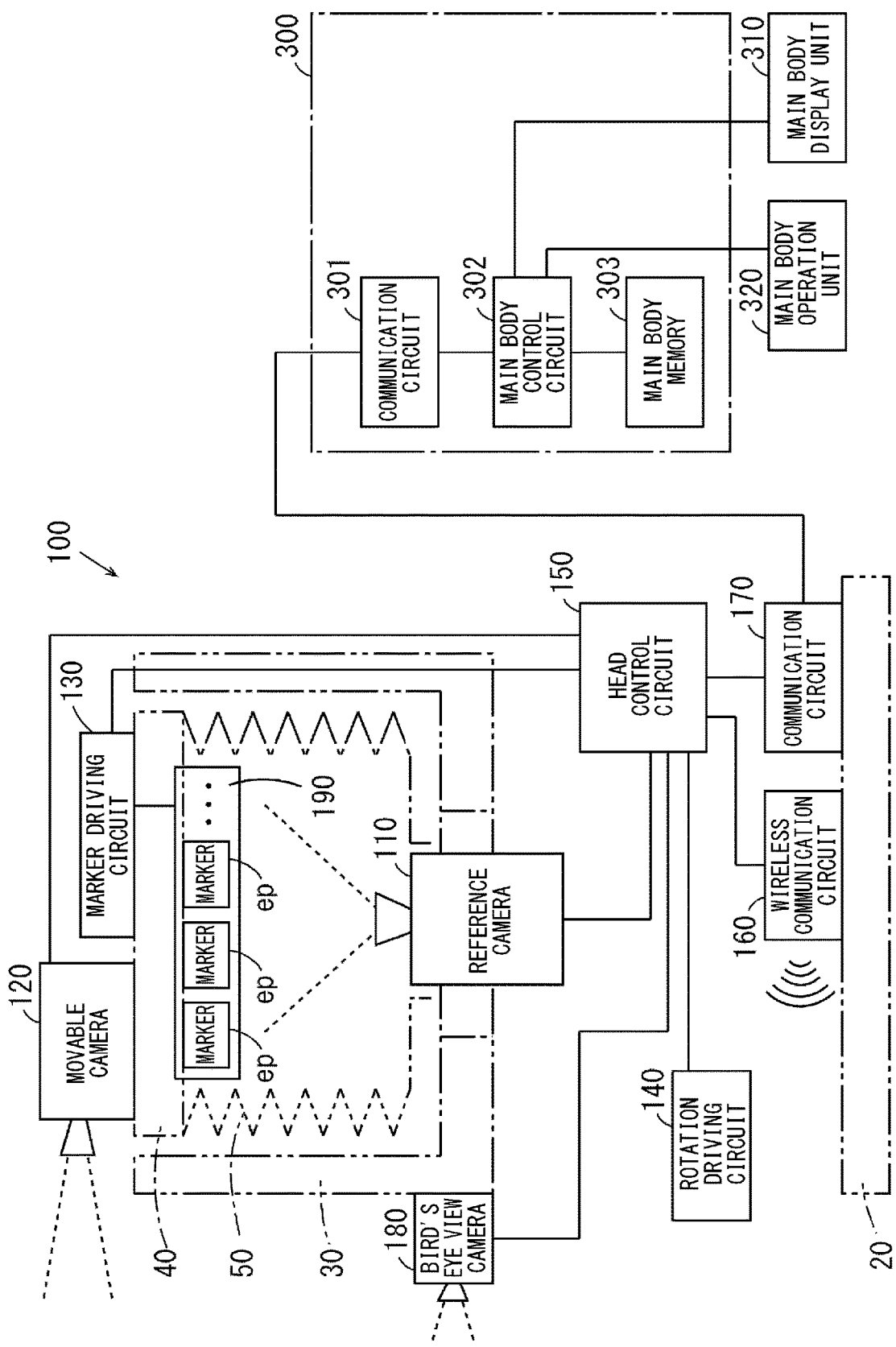
FIG. 2 is a block diagram illustrating the structures of an imaging head and a processing device.
Figure 3:
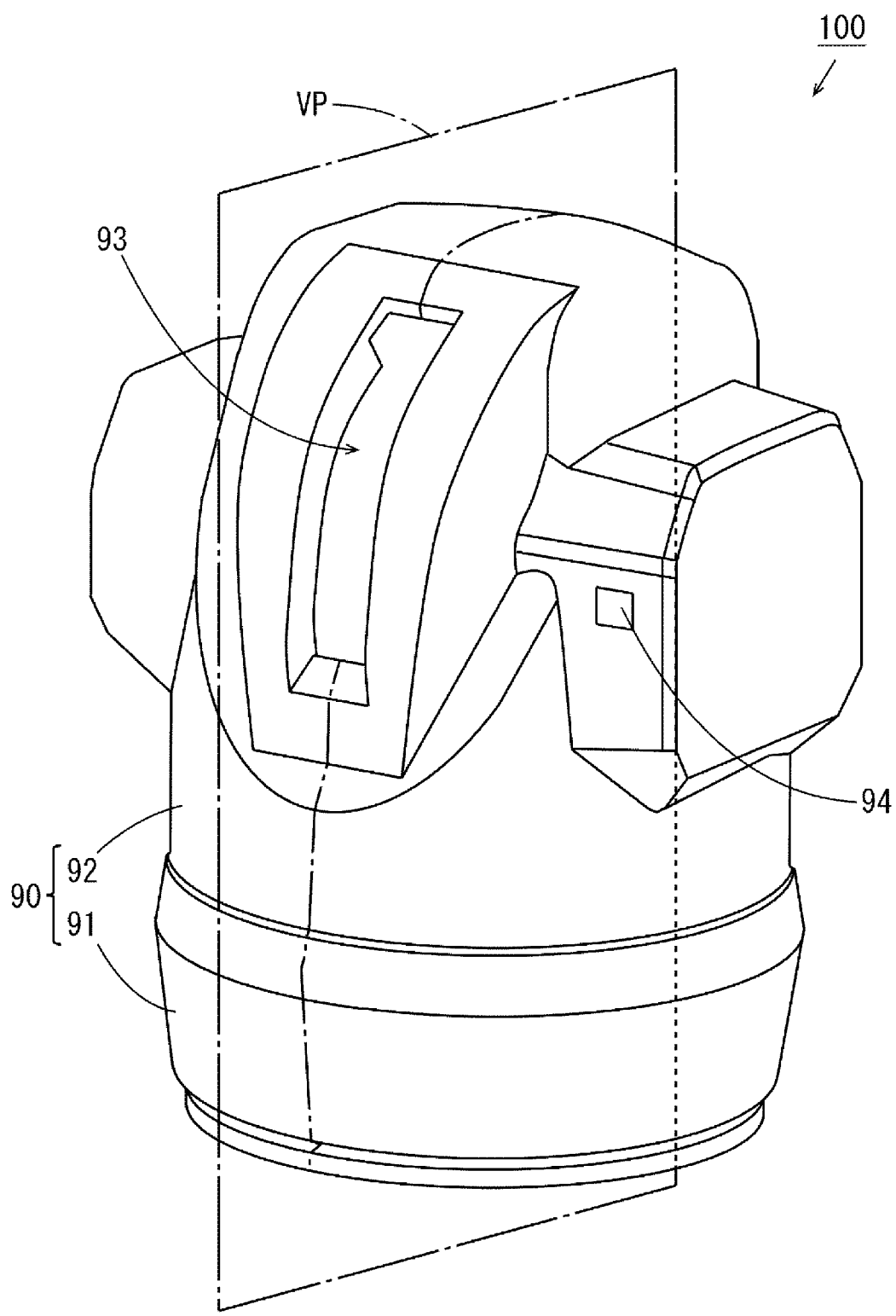
FIG. 3 is a perspective view illustrating the external appearance of the imaging head.
Figure 4:
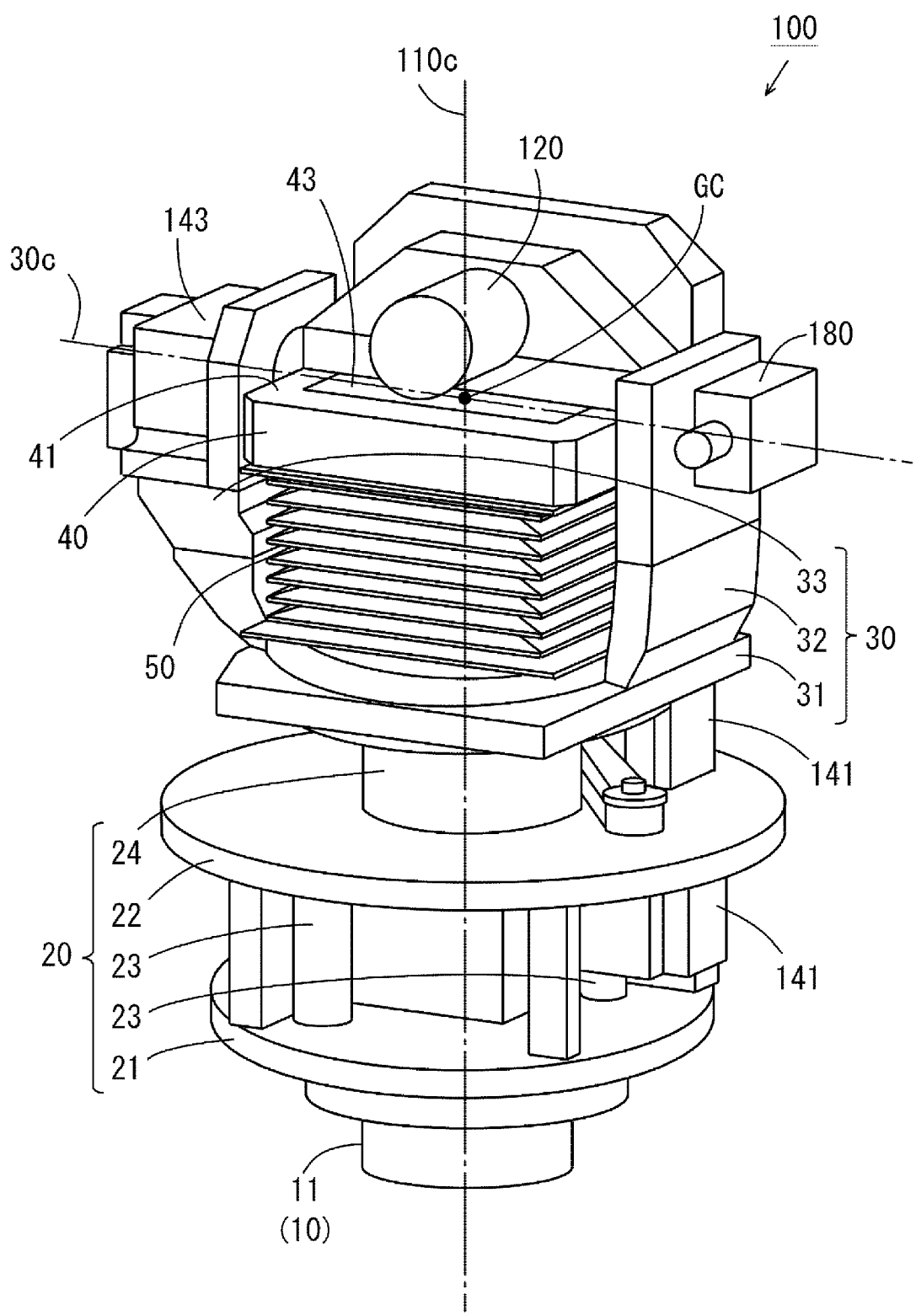
FIG. 4 is a perspective view illustrating the external appearance of the imaging head from which a casing has been removed.
Figure 5:
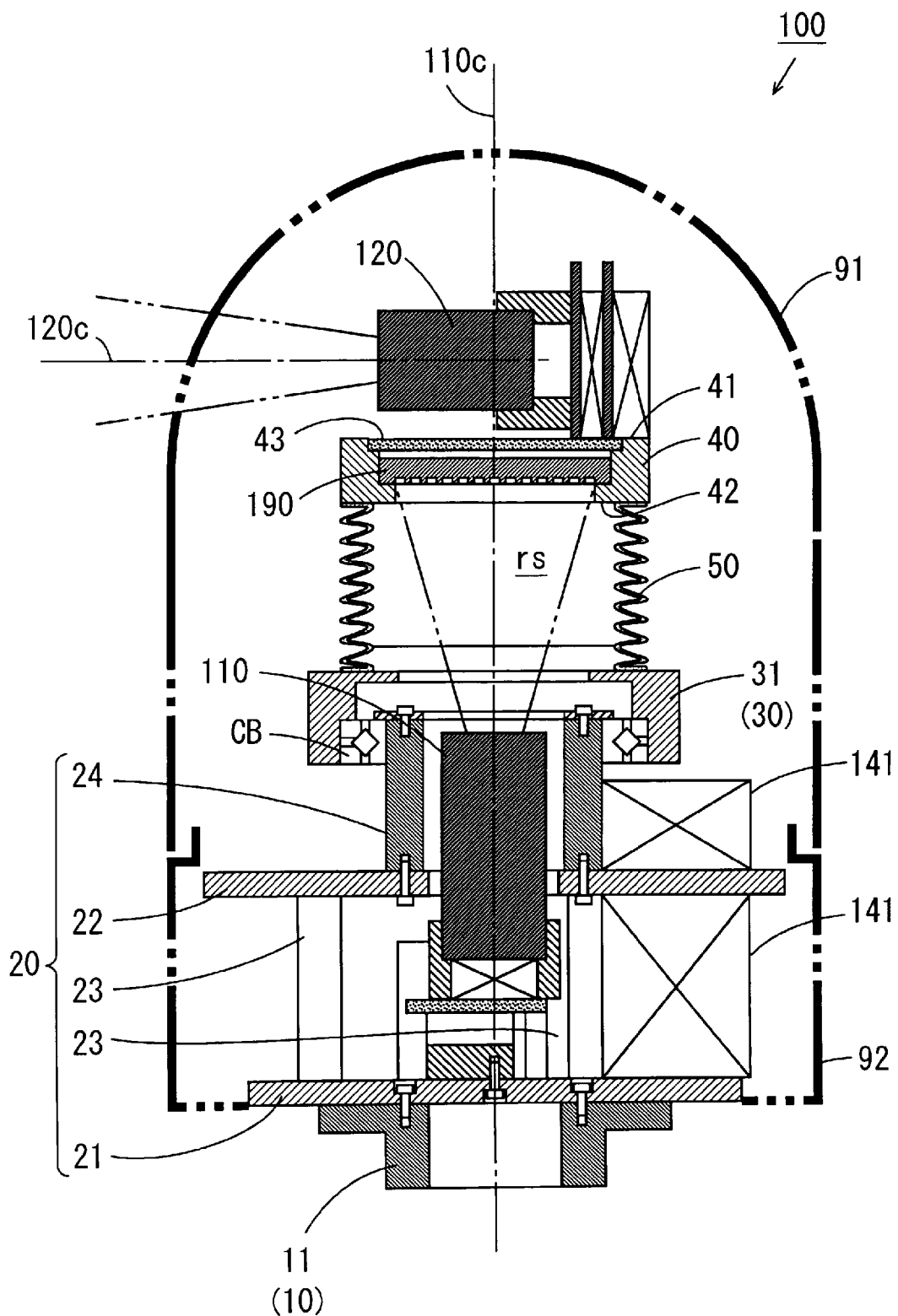
FIG. 5 is a schematic longitudinal sectional view illustrating the imaging head taken in a virtual plane in FIG. 3.

FIG. 2 is a block diagram illustrating the structures of the imaging head 100 and the processing device 300. FIG. 3 is a perspective view illustrating the external appearance of the imaging head 100, FIG. 4 is a perspective view illustrating the external appearance of the imaging head 100 from which a casing 90 has been removed, and FIG. 5 is a schematic longitudinal sectional view illustrating the imaging head 100 taken in a virtual plane VP in FIG. 3.

First, the structure of the imaging head 100 will be described. As illustrated in FIG. 2, the imaging head 100 includes a reference camera 110, the movable camera 120, a marker driving circuit 130, a rotation driving circuit 140, a head control circuit 150, a wireless communication circuit 160, a communication circuit 170, a bird's eye view camera 180, and the reference member 190 as electric components. These components are accommodated in the casing 90 illustrated in FIG. 3 in the state in which they are supported by one of a fixing and coupling section 20, a supporting member 30, and a movable member 40 indicated by dot-dot-dash lines in FIG. 2.

As illustrated in FIG. 3, the casing 90 includes a lower casing 91 and an upper casing 92. As illustrated in FIG. 3 and FIG. 5, the lower casing 91 is substantially cylindrical and extends upward a certain distance from the lower end part of the imaging head 100. The upper casing 92 is provided above the lower casing 91. The upper casing 92 is substantially bell-shaped and provided rotatably together with the supporting member 30 (FIG. 4), which will be described below, in a horizontal plane.

As illustrated in FIG. 3, a slit 93 extending in an up-down direction is formed in a part of the upper casing 92. The slit 93 guides the imaging visual field of the movable camera 120 to the outside of the casing 90. In addition, a window 94 for the bird's eye view camera is formed in the upper casing 92. The window 94 for the bird's eye view camera guides the imaging visual field of the bird's eye view camera 180 to the outside of the casing 90.

As illustrated in FIG. 4 and FIG. 5, the fixing and coupling section 20 includes the lower fixing plate 21, an upper fixing plate 22, a plurality of (for example, four) columns 23, and the hollow supporting shaft 24. The lower fixing plate 21 is disc-shaped and fixed to the upper surface of the fixing section 11 of the reference stand 10 with screws. The upper fixing plate 22 is provided above the lower fixing plate 21 via the plurality of columns 23. The upper fixing plate 22 is disc-shaped as the lower fixing plate 21. A circular opening is formed at the center of the upper fixing plate 22. The hollow supporting shaft 24 is fixed to the upper surface of the upper fixing plate 22 with screws so as to surround the opening at the center of the upper fixing plate 22. The lower casing 91 in FIG. 3 is attached to one of members that constitute the fixing and coupling section 20.

In the fixing and coupling section 20, the space between the lower fixing plate 21 and the upper fixing plate 22 is provided with various types of substrates on which the rotation driving circuit 140, the head control circuit 150, the wireless communication circuit 160, and the communication circuit 170 in FIG. 2 are mounted. In addition, on the lower fixing plate 21, the reference camera 110 is provided so as to extend from the lower fixing plate 21 to the inside of the hollow supporting shaft 24 through the opening of the upper fixing plate 22 as illustrated in FIG. 5. In this state, the imaging visual field of the reference camera 110 faces upward. In the embodiment, an optical axis 110c of the optical system of the reference camera 110 is aligned with the center axis of the hollow supporting shaft 24.

On the lower fixing plate 21 and the upper fixing plate 22, a horizontal rotation mechanism 141 is provided in addition to various types of substrates and the reference camera 110 described above. The horizontal rotation mechanism 141 is used to rotate the supporting member 30, which will be described later, about the center axis of the hollow supporting shaft 24 (in a plane parallel with the upper surface of the reference stand 10). The horizontal rotation mechanism 141 includes, for example, a motor and various types of power transmission members.

As illustrated in FIG. 4, the supporting member 30 is provided on the hollow supporting shaft 24 of the fixing and coupling section 20. The supporting member 30 includes the rotation base 31 and a pair of supporting frames 32 and 33. A rotation base 31 has an opening at the center thereof and is mounted to the upper end part of the hollow supporting shaft 24 via a cross roller bearing CB (FIG. 5) so that the supporting member 30 is rotatable about the center axis of the hollow supporting shaft 24. The upper casing 92 in FIG. 3 is mounted to one of the members that constitute the supporting member 30. When the supporting member 30 rotates with respect to the hollow supporting shaft 24, the upper casing 92 rotates together with the supporting member 30 relatives to the lower casing 91.

The pair of supporting frames 32 and 33 is formed so as to extend upward from one side and the other side of the rotation base 31 while facing each other. Between the pair of supporting frames 32 and 33, the movable member 40 is provided a predetermined distance apart from the rotation base 31.

The movable member 40 is supported by the supporting frames 32 and 33 so as to be rotatable (tiltable with respect to the horizontal plane) about a rotational axis 30c passing through the portions of the pair of supporting frames 32 and 33 facing each other. In the embodiment, the rotational axis 30c is orthogonal to the optical axis 110c of the reference camera 110 (FIG. 5) and the center axis of the hollow supporting shaft 24.

In the vicinity of the upper end part of the one supporting frame 32, the bird's eye view camera 180 is mounted in a portion positioned on the rotational axis 30c on a side opposite to the movable member 40. In the vicinity of the upper end part of the other supporting frame 33, a tilt rotation mechanism 143 is mounted in a portion positioned on the rotational axis 30c on a side opposite to the movable member 40. The tilt rotation mechanism 143 includes, for example, a motor and various types of power transmission members. The tilt rotation mechanism 143 rotates the movable member 40 about the rotational axis 30c. It should be noted here that the range in which the tilt rotation mechanism 143 can rotate the movable member 40 is limited to, for example, 30 degrees or so.

The movable member 40 is formed in a substantially square short cylinder and has an upper surface 41 and a lower surface 42. The movable camera 120 and various types of substrates that accompany the movable camera 120 are fixed to the movable member 40. In this state, an optical axis 120c (FIG. 5) of the optical system of the movable camera 120 is parallel with the upper surface 41 of the movable member 40.

A substrate 43 on which the marker driving circuit 130 in FIG. 2 is mounted is provided in the upper end part of the movable member 40 so as to close the opening at the center thereof.

Figure 6A:
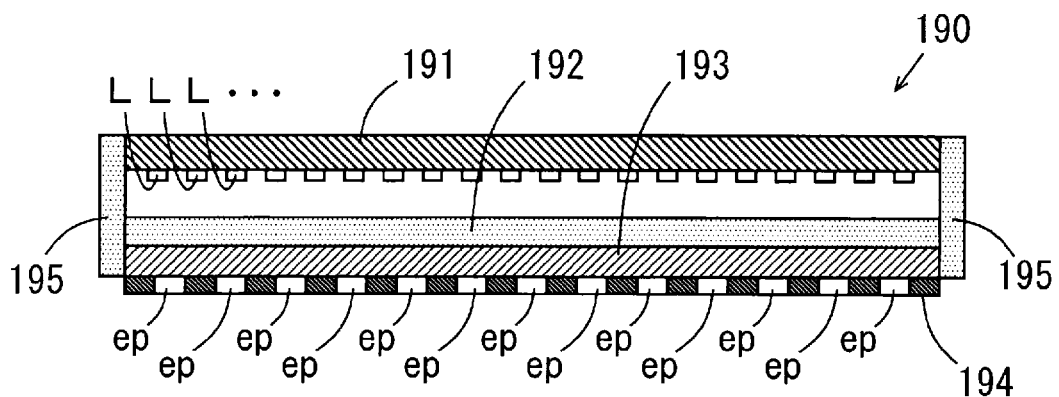
FIG. 6A is a schematic longitudinal sectional view illustrating a reference member in FIG. 5.

As illustrated in FIG. 5, the reference member 190 having the plurality of markers ep (FIG. 2) is provided inside the movable member 40. FIG. 6A is a schematic longitudinal sectional view illustrating the reference member 190 in FIG. 5 and FIG. 6B is a bottom view illustrating the reference member 190.

Figure 6B:
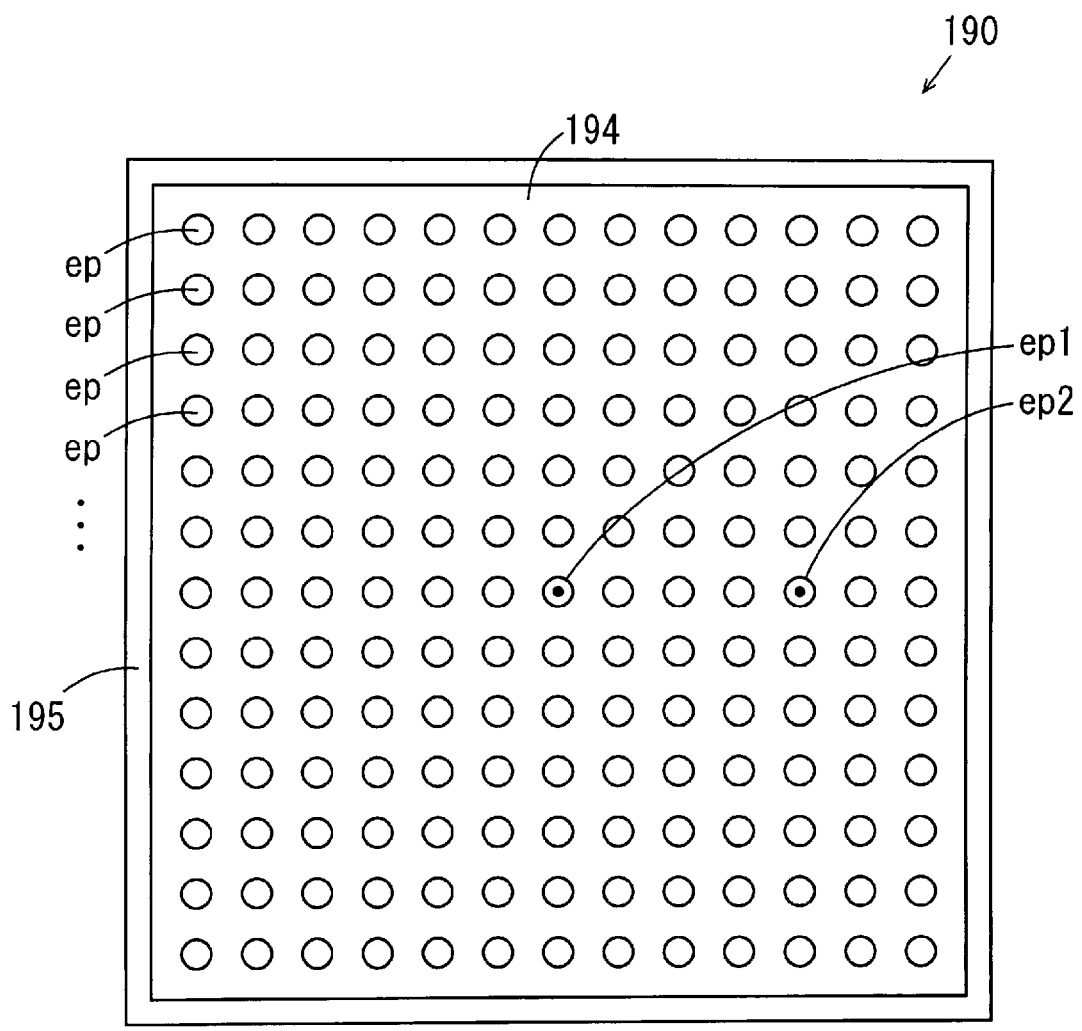
FIG. 6B is a bottom view illustrating the reference member.

As illustrated in FIGS. 6A and 6B, the reference member 190 includes a light emitting substrate 191, a diffusion plate 192, a glass plate 193, and a diffuse reflection sheet 195. The light emitting substrate 191, the diffusion plate 192, and the glass plate 193 are laminated in this order from above to below. The diffuse reflection sheet 195 is provided so as to surround the outer periphery part of this laminated body.

A plurality of light emitting elements L is mounted on the entire lower surface of the light emitting substrate 191. The light emitting elements L are, for example, infrared LEDs (light emitting diodes). As the light emitting elements L, LEDs emitting other wavelengths may be used instead of infrared LEDs or other types of light emitting elements such as filaments may be used. The marker driving circuit 130 drives the plurality of light emitting elements L on the light emitting substrate 191. This causes the plurality of light emitting elements L to emit light.

The diffusion plate 192 is a plate member made of, for example, resin and transmits light emitted from the plurality of light emitting elements L downward while diffusing the light. The diffuse reflection sheet 195 is a strip-shaped sheet member made of, for example, resin and reflects the light from the plurality of light emitting elements L toward the side (outside) of the reference member 190 inward while diffusing the light.

The glass plate 193 is a plate member made of, for example, quartz glass or soda glass. The lower surface of the glass plate 193 is provided with the mask 194 having a plurality of circular openings. The mask 194 is a chrome mask formed on the lower surface of, for example, the glass plate 193 by a sputtering method or a vapor depositing method.

In the structure described above, the light emitted from the plurality of light emitting elements L and diffused by the diffusion plate 192 and the diffuse reflection sheet 195 is released downward of the reference member 190 through the glass plate 193 and the plurality of circular openings of the mask 194. In this way, the plurality of self-emission markers ep corresponding to the plurality of circular openings, respectively, is formed.

In the embodiment, as illustrated in FIG. 6B, the plurality of markers ep is arranged at regular intervals in a matrix on the lower surface (plane) of the reference member 190. Of the plurality of markers ep, the marker ep placed at the center and the marker ep spaced apart a predetermined distance from the marker ep at the center are denoted by identification marks (points in this example) to identify these two markers from the other markers ep. These identification marks are formed by a part of the mask 194. In the following description, to distinguish these two markers ep denoted by the identification marks from the plurality of markers ep, the center marker ep having the identification mark is referred to as a first marker ep1. In addition, the other marker ep having the identification mark is referred to as a second marker ep2.

In the structure described above, the reference member 190 is attached to the movable member 40 so that the plurality of markers ep facing downward is positioned within the range of the imaging visual field of the reference camera 110. In addition, the reference member 190 is attached to the movable member 40 so that the first marker ep1 is positioned on the optical axis 110c when the upper surface 41 and the lower surface 42 of the movable member 40 are orthogonal to the direction of the optical axis 110c of the reference camera 110.

When the supporting member 30 rotates on the fixing and coupling section 20 and when the movable member 40 rotates about the rotational axis 30c, the image of the plurality of markers ep obtained when the reference camera 110 captures the reference member 190 are changed.

Figure 7A:
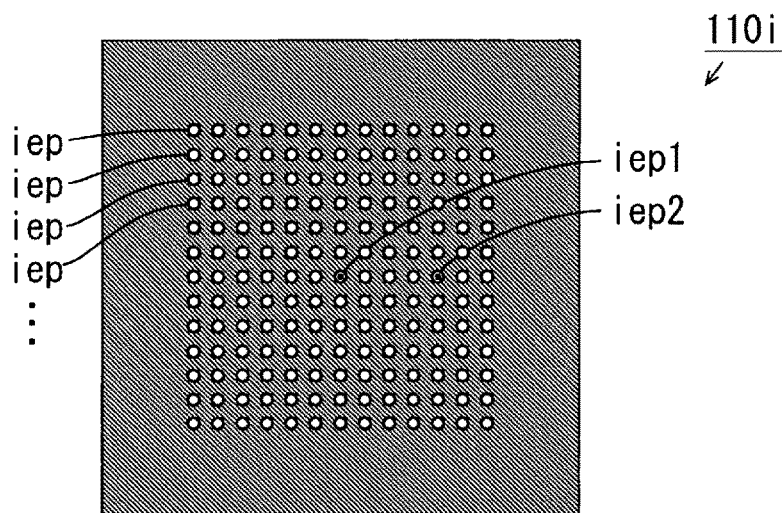
FIGS. 7A-7C illustrates examples of images of a plurality of markers obtained by capturing the reference member using a reference camera.
Figure 7B:
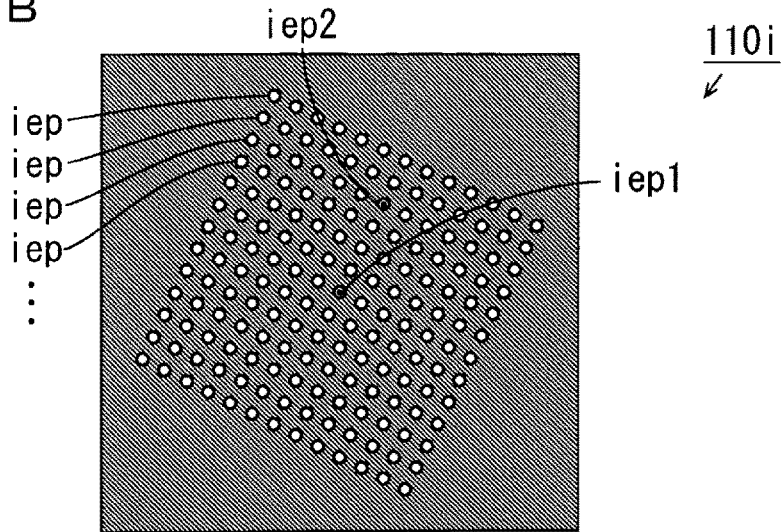
Figure 7C:
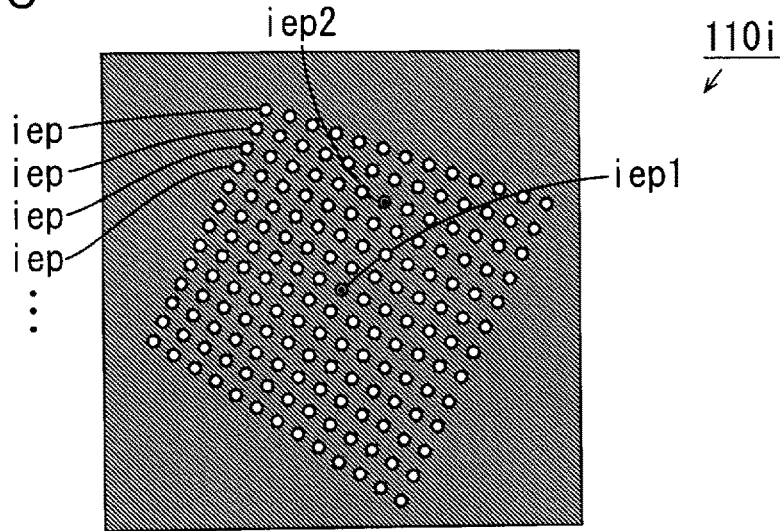

FIGS. 7A to 7C illustrate examples of the images of the plurality of markers ep obtained when the reference camera 110 captures the reference member 190. Since light is released from the plurality of markers ep in FIG. 6B, the images corresponding to the plurality of markers ep appear in the image of the reference member 190 captured by the imaging head 100.

For example, when the supporting member 30 and the movable member 40 are held in their predetermined reference postures, an image 110i illustrated in FIG. 7A is assumed to be obtained. In the reference postures, the lower surface of the reference member 190 is orthogonal to the optical axis 110c of the reference camera 110 and held horizontally. In the image 110i in FIG. 7A, marker images iep corresponding to the plurality of markers ep, respectively, are arranged in a matrix as in the plurality of actual markers ep in FIG. 6B. In addition, the marker image iep1 corresponding to the first marker ep1 in FIG. 6B is illustrated in the central part of the image corresponding to the center of the visual field of the reference camera 110. In addition, a marker image iep2 corresponding to the second marker ep2 in FIG. 6B is illustrated in a position spaced apart a predetermined distance from the marker image iep1.

When the supporting member 30 rotates from the reference posture, the distances between the plurality of markers ep and the reference camera 110 do not change significantly. In this rotation, as illustrated in FIG. 7B, the plurality of marker images iep rotate about the central part of the image. In this case, the rotation angle of the supporting member 30 from the reference, posture can be obtained based on the positional relationship between the two marker images iep1 and iep2.

When the movable member 40 rotates from the reference posture, the distances between the plurality of markers ep and the reference camera 110 change individually. For example, the distances between parts of the plurality of markers ep and the reference camera 110 become smaller and the distances between other parts of the plurality of markers ep and the reference camera 110 become larger. Accordingly, when, for example, the movable member 40 rotates from the reference posture in the state in which the supporting member 30 is held in the rotation position corresponding to the image 110i in FIG. 7B, the arrangement of the plurality of marker images iep is distorted as illustrated in FIG. 7C. In this case, the rotation angle of the movable member 40 from the reference posture can be obtained based on the positional relationship of all marker images iep including the two marker images iep1 and iep2. It should be noted here that the rotatable angle range of the movable member 40 is relatively small (approximately 30 degrees) as described above. Therefore, even when the movable member 40 rotates, the positional relationship between the two marker images iep1 and iep2 does not change significantly.

As described above, the movable camera 120 and the reference member 190 are integrally fixed to the movable member 40. Accordingly, the position and the posture of the movable camera 120 with respect to the reference camera 110 can be calculated based on the image data (referred to below as the reference image data) obtained by capturing the plurality of markers ep of the reference member 190 using the reference camera 110.

Between the movable member 40 and the rotation base 31, a bellows 50 is provided to spatially blocks an imaging space rs (FIG. 5) including the imaging visual field of the reference camera 110 from the reference camera 110 to the reference member 190, from the outside of the imaging space rs.

The upper end part of the bellows 50 is coupled to the lower surface 42 of the movable member 40 and the lower end part of the bellows 50 is coupled to the upper surface of the rotation base 31. Accordingly, when the supporting member 30 rotates in the horizontal plane, the bellows 50 also rotates together with the supporting member 30.

In addition, the bellows 50 in this example is formed in a substantially square column and, when the tilt rotation mechanism 143 rotates the movable member 40, deformed following the rotation, thereby maintaining the optical and spatial block state of the imaging space rs. In addition, when the bellows 50 is deformed following the rotation of the movable member 40, the bellows 50 is provided so as not to interfere with the imaging visual field of the reference camera 110.

This structure prevents light from entering the imaging space rs from the outside of the imaging space rs. In addition, even when a motor or the like is heated around the imaging space rs, the generated heat is prevented from entering the imaging space rs. This prevents the atmosphere of the imaging space rs from fluctuating. Accordingly, since the plurality of markers ep is captured with high accuracy, the position and the posture of the movable camera 120 with respect to the reference camera 110 can be calculated with high accuracy.

In addition, in the structure described above, since the inner space of the bellows 50 is spatially blocked from the outer space, the atmosphere of the inner space of the bellows 50 becomes stable. Accordingly, the heat source provided outside the bellows 50 can be forcibly cooled by a fan or the like.

It should be noted here that the inner surface of the bellows 50 that faces the imaging space rs is preferably configured by a color or material that has a small light reflectivity and absorbs light. For example, the color of the inner surface of the bellows 50 may be black. Alternatively, the inner surface of the bellows 50 may be configured by a nonreflective material that does not reflect light. Alternatively, the inner surface of the bellows 50 may be coated with a nonreflective material. This prevents light released by the plurality of markers ep from being irregularly reflected by the inner surface of the bellows 50. Accordingly, the plurality of markers ep can be captured with high accuracy.

In the imaging head 100, as illustrated in FIG. 4, the movable camera 120 is preferably provided so that the barycenter of the movable camera 120 approaches an intersection point GC between the optical axis 110c of the reference camera 110 and the rotational axis 30c. In this case, as the barycenter of the movable camera 120 is closer to the intersection point GC, the rotation of the supporting member 30 about the optical axis 110c becomes more stable and the rotation of the movable member 40 about the rotational axis 30c becomes more stable. In addition, the driving force required to rotate the supporting member 30 and the movable member 40 can be reduced. This reduces the load applied to the driving units such as the motor.

As illustrated in FIG. 4, the bird's eye view camera 180 is provided on the supporting frame 32 so that the imaging visual field thereof is oriented in the same or substantially the same direction as the imaging visual field of the movable camera 120. The angle of view of the bird's eye view camera 180 is larger than the angles of view of the reference camera 110 and the movable camera 120. Accordingly, the imaging visual field of the bird's eye view camera 180 is larger than the imaging visual fields of the reference camera 110 and the movable camera 120. It should be noted here that the angle of view of the movable camera 120 is set, for example, so as to cover a circular area with a diameter of 15 cm or so at a position 1.5 meters apart from the movable camera 120.

In tracking processing, which will be described later, the bird's eye view camera 180 is used to capture the probe 200 over a wide range. Even when, for example, the probe 200 deviates from the imaging visual field of the movable camera 120 due to the movement of the probe 200 in this case, by capturing the probe 200 using the bird's eye view camera 180, the approximate position of the probe 200 can be specified based on the image data (referred to below as bird's eye view image data) by the capturing. The position and posture of the movable camera 120 are adjusted based on the specified position so that the probe 200 is positioned in the imaging visual field of the movable camera 120.

As illustrated in FIG. 2, the reference camera 110, the movable camera 120, the marker driving circuit 130, the rotation driving circuit 140, the wireless communication circuit 160, and the communication circuit 170 are connected to the head control circuit 150. The head control circuit 150 includes a CPU (central processing unit) and a memory or a microcomputer and controls the reference camera 110, the movable camera 120, the marker driving circuit 130, and the rotation driving circuit 140.

Each of the reference camera 110, the movable camera 120, and the bird's eye view camera 180 includes a CMOS (complementary metal oxide film semiconductor) image sensor capable of detecting infrared light, as an imaging element. In addition, each of the reference camera 110, the movable camera 120, and the bird's eye view camera 180 includes a plurality of lenses (optical systems), which is not illustrated.

As described above, the pixels of the reference camera 110, the movable camera 120, and the bird's eye view camera 180 output the analog electric signals (referred to below as light-receiving signals) corresponding to the detection amount of to the head control circuit 150.

An A/D converter (analog-to-digital converter) and a FIFO (first-in first-out) memory, which are not illustrated, are mounted on the head control circuit 150. The light-receiving signals output from the reference camera 110, the movable camera 120, and the bird's eye view camera 180 are sampled by the A/D converter of the head control circuit 150 at a constant sampling period and converted into digital signals. The digital signals output from the A/D converter are accumulated in FIFO memory in sequence. The digital signals accumulated in the FIFO memory are transferred to the processing device 300 in sequence as pixel data.

The marker driving circuit 130 drives the light emitting substrate 191 in FIG. 6A under control of the head control circuit 150. This causes the plurality of light emitting elements L on the light emitting substrate 191 to emit light and the plurality of markers eq of the reference member 190 to release light. It should be noted here that this light emission timing synchronizes with the capturing timing of the reference camera 110.

The rotation driving circuit 140 drives the horizontal rotation mechanism 141 in FIG. 4 under control of the head control circuit 150. This rotates the supporting member 30 in FIG. 4 on the fixing and coupling section 20 and rotates the movable member 40 and the upper casing 92 (FIG. 3). At this time, since the movable member 40 rotates, the imaging visual field of the movable camera 120 introduced from the inside to the outside of the upper casing 92 through the slit 93 (FIG. 3) rotates in a horizontal direction on the reference stand 10 in FIG. 1.

In addition, the rotation driving circuit 140 drives the tilt rotation mechanism 143 in FIG. 4 under control of the head control circuit 150. This rotates the movable member 40 in FIG. 4 about the rotational axis 30c between the pair of supporting frames 32 and 33. At this time, the imaging visual field of the movable camera 120 that passes through the slit 93 (FIG. 3) rotates in an up-down direction along the slit 93 on the reference stand 10 in FIG. 1. The rotation of the imaging visual field of the movable camera 120 by the rotation driving circuit 140 is performed based on tracking processing, which will be described later, by the processing device 300.

The head control circuit 150 performs wireless communication with the probe 200 via the wireless communication circuit 160. In addition, the head control circuit 150 performs wired communication with the processing device 300 via the communication circuit 170 and the cable CA (FIG. 1).

As illustrated in FIG. 2, the processing device 300 includes a communication circuit 301, a main body control circuit 302, and a main body memory 303. The communication circuit 301 and the main body memory 303 are connected to the main body control circuit 302. In addition, a main body operation unit 320 and a main body display unit 310 are connected to the main body control circuit 302.

The main body memory 303 includes a ROM (read-only memory), a RAM (random access memory), and a hard disk. The main body memory 303 stores a measurement target portion setting program, a measured value calculation program, a tracking processing program, which will be described later, and a program concerning screen display together with a system program. In addition, the main body memory 303 is used to process various types of data and store various types of data such as pixel data given by the imaging head 100. Furthermore, the main body memory 303 stores a plurality of types of main screen generation data for generating screen data indicating the screen to be displayed on the main body display unit 310 according to an operation of the three-dimensional coordinate measuring device 1 by the user U.

The main body control circuit 302 includes a CPU. In the embodiment, the main body control circuit 302 and the main body memory 303 are achieved by a personal computer. The main body control circuit 302 generates image data based on pixel data given from the imaging head 100 via the cable CA (FIG. 1) and the communication circuit 301. The image data is a set including a plurality of pieces of pixel data.

In the embodiments, provided on the imaging head 100, reference image data, measurement image data, and bird's eye view image data corresponding to the reference camera 110, the movable camera 120, and the bird's eye view camera 180, respectively, are generated. In addition, image data corresponding to a probe camera 208, which will be described later, provided on the probe 200 is generated. The main body control circuit 302 calculates the position of the contact part 211a (FIG. 1) of the probe 200 based on the reference image data and the measurement image data.

Furthermore, the main body control circuit 302 generates screen data indicating the screen to be displayed on the main body display unit 310 based on the plurality of types of main screen generation data stored in the main body memory 303. Details on the screen to be displayed on the main body display unit 310 will be described later.

The main body display unit 310 is configured by, for example, a liquid crystal display panel or an organic EL (electroluminescence) panel. The main body display unit 310 displays the coordinates of measurement points on the measurement target S, the measurement results of individual portions of the measurement target S, and the like under control of the main body control circuit 302. In addition, the main body display unit 310 displays a setting screen on which various settings about measurement are made.

The main body operation unit 320 includes a keyboard and a pointing device. The pointing device includes a mouse, a joystick, or the like. The main body operation unit 320 is operated by the user U.

[3] Structure of the Probe 200

Figure 8:
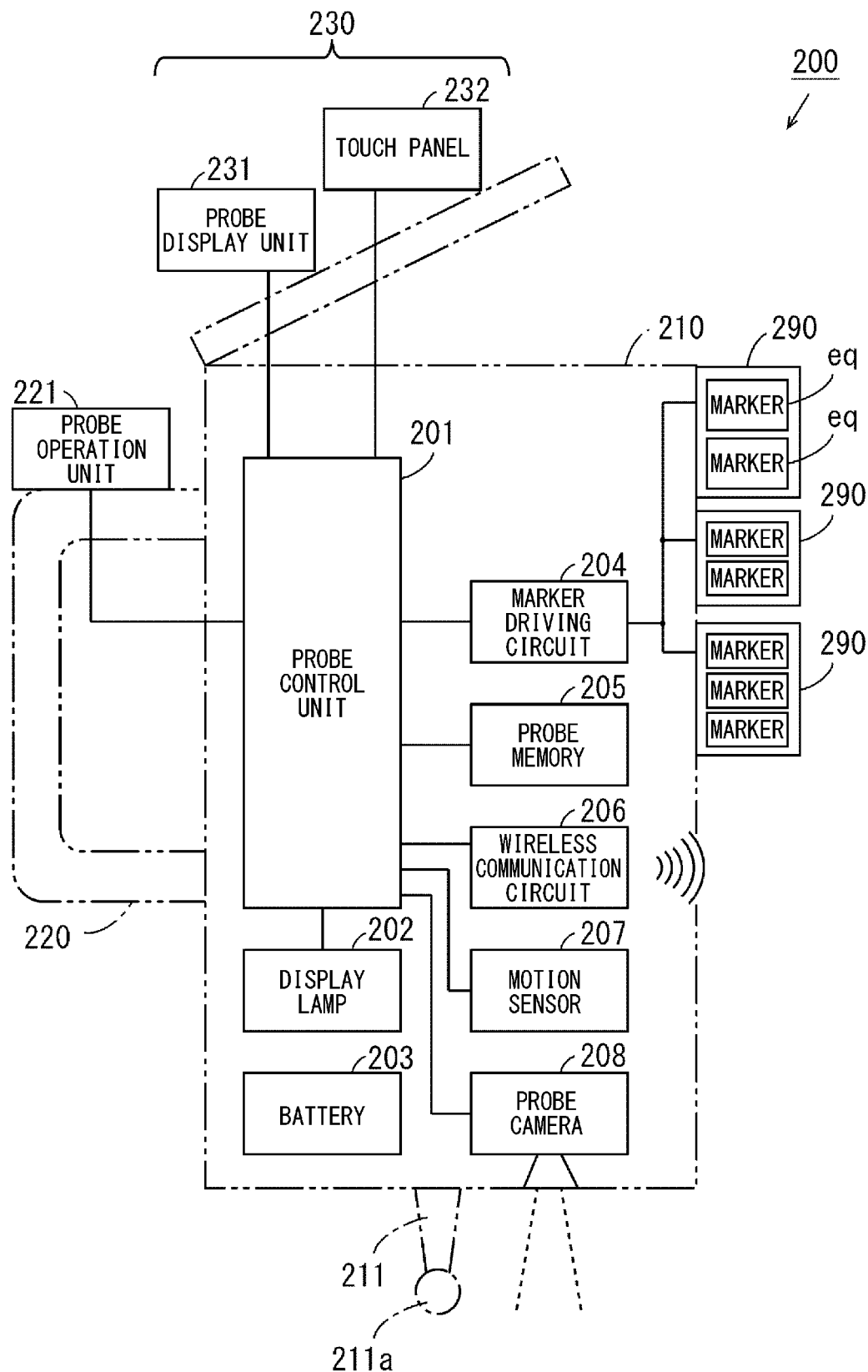
FIG. 8 is a block diagram illustrating the structure of a probe.
Figure 9:
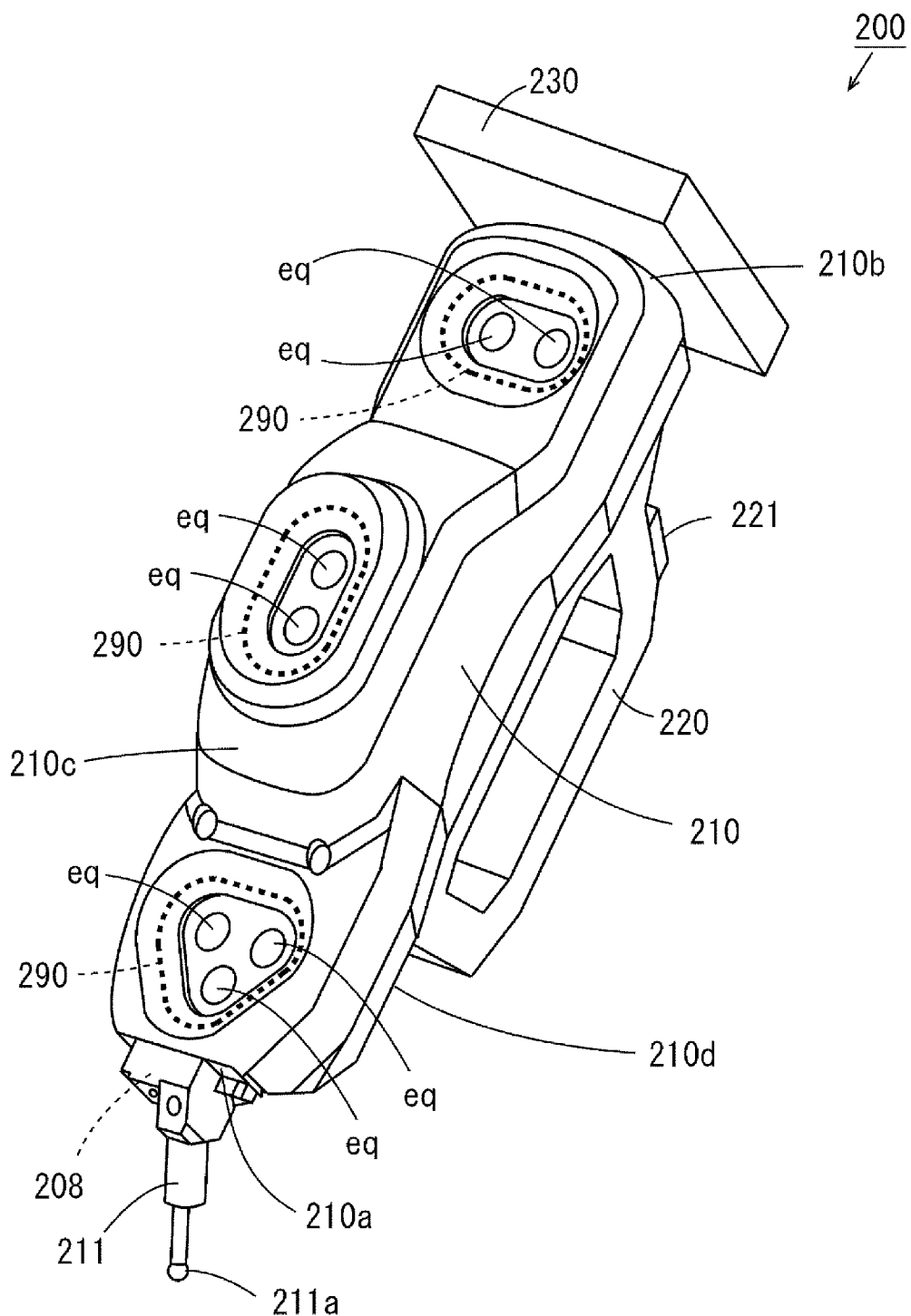
FIG. 9 is a perspective view illustrating the external appearance of the probe.

FIG. 8 is a block diagram illustrating the structure of the probe 200. FIG. 9 is a perspective view illustrating the external appearance of the probe 200. As illustrated in FIG. 8, the probe 200 includes a probe control unit 201, a display lamp 202, a battery 203, a marker driving circuit 204, a probe memory 205, a wireless communication circuit 206, a motion sensor 207, the probe camera 208, a probe operation unit 221, a touch panel display 230, and a plurality of (three in this example) target members 290 as electric components.

The battery 203 supplies electric power to other components provided in the probe 200. The probe control unit 201 includes a CPU and a memory or a microcomputer and controls the display lamp 202, the marker driving circuit 204, the probe camera 208, and the touch panel display 230. In addition, the probe control unit 201 performs various types of processings in response to the operation of the probe operation unit 221 and the touch panel display 230 by the user U.

Furthermore, the probe control unit 201 generates screen data indicating the screen to be displayed on the touch panel display 230 based on a plurality of types of sub screen generation data described later. Details on the screen to be displayed on the touch panel display 230 will be described later.

As indicated by a dot-dot-dash line in FIG. 8, the probe 200 has a probe casing 210 that accommodates or supports the components described above and a grip part 220. The probe control unit 201, the display lamp 202, the battery 203, the marker driving circuit 204, the probe memory 205, the wireless communication circuit 206, the motion sensor 207, and the probe camera 208 are accommodated in the probe casing 210. The plurality of target members 290 is provided on an upper surface part 210c (FIG. 9), which will be described later, of the probe casing 210. The probe operation unit 221 is a button that can be pushed and provided in the grip part 220. The probe operation unit 221 is depressed by the user when, for example, the user instructs a measurement point.

The touch panel display 230 includes a probe display unit 231 and a touch panel 232. The probe display unit 231 is configured by, for example, a liquid crystal display panel or an organic EL panel.

The display lamp 202 includes, for example, one or more LEDs and a light emitting section thereof is provided so as to be exposed to the outside of the probe casing 210. The display lamp 202 emits light according to the state of the probe 200 under control of the probe control unit 201.

The three target members 290 have basically the same structure as the reference member 190 in FIGS. 6A and 6B. The marker driving circuit 204 is connected to the plurality of target members 290 and drives a plurality of light emitting elements included in the target members 290 under control of the probe control unit 201.

The probe memory 205 includes a recording medium such as a non-volatile memory or a hard disk. The probe memory 205 stores a program concerning screen display, which will be described later. In addition, the probe memory 205 is used to process various types of data or store various types of data such as image data given by the imaging head 100. Furthermore, the probe memory 205 stores a plurality types of sub screen generation data for generating screen data indicating the screen to be displayed on the touch panel display 230 according to an operation of the three-dimensional coordinate measuring device 1 by the user U.

The motion sensor 207 detects the movement of the probe 200 when, for example, the user U moves while carrying the probe 200. For example, the motion sensor 207 detects the movement direction, the acceleration, the posture, and the like when the probe 200 moves. The probe camera 208 is, for example, a CCD (charge-coupled device) camera.

An A/D converter and a FIFO memory, which are not illustrated, are mounted in the probe control unit 201 in addition to the CPU and the memory or the microcomputer described above. Accordingly, in the probe control unit 201, signals indicating the motion of the probe 200 detected by the motion sensor 207 are converted to data of digital signal type (referred to below as motion data). In addition, the probe control unit 201 converts light-receiving signals output from pixels of the probe camera 208 to a plurality of pieces of pixel data of digital signal type. The probe control unit 201 transmits, via wireless communication, the digital motion data and the plurality of pieces of pixel data to the imaging head 100 in FIG. 2 through the wireless communication circuit 206. In this case, the motion data and the plurality of pieces of pixel data are further transferred to the processing device 300 from the imaging head 100.

As illustrated in FIG. 9, the probe casing 210 is formed so as to extend in one direction and has a front end part 210a, a rear end part 210b, the upper surface part 210c, and a bottom surface part 210d. The bottom surface part 210d is provided with the grip part 220. The grip part 220 is formed so as to extend in parallel with the probe casing 210. The probe operation unit 221 is provided in the part of the grip part 220 close to the rear end part 210b of the probe casing 210.

The rear end part 210b of the probe casing 210 is provided with the touch panel display 230. The front end part 210a is provided with a stylus 211. The stylus 211 is a rod-like member having the contact part 211a at a tip thereof. The front end part 210a further has the probe camera 208.

The upper surface part 210c of the probe casing 210 is provided with the three target members 290 arranged from the front end part 210a to the rear end part 210b. Of the three target members 290 in this example, the target member 290 closest to the front end part 210a has the three markers eq. Each of the two remaining target members 290 has the two markers eq. The markers ep are self-emission markers that emit infrared light. It should be noted here that the emission timing of the plurality of markers eq synchronizes with the capturing timing of the movable camera 120 of the imaging head 100.

The user U grasps the grip part 220 so that the upper surface part 210c of the probe casing 210 faces the imaging head 100. In this state, the user U brings the contact part 211a into contact with a desired part of the measurement target S. In addition, the user U operates the probe operation unit 221 and the touch panel display 230 while visually recognizing an image displayed on the touch panel display 230.

[4] Method for Calculating the Coordinates of a Measurement Point

In the three-dimensional coordinate measuring device 1 according to the embodiment, a three-dimensional coordinate system (referred to below as the device coordinate system) having a predetermined relationship with respect to the reference camera 110 is predefined. In addition, the main body memory 303 of the processing device 300 stores the relative positional relationship of the plurality of markers ep in the reference member 190 in advance.

As described above, the reference camera 110 captures the plurality of markers ep of the reference member 190. In this case, the main body control circuit 302 in FIG. 2 calculates the coordinates of the markers ep in the device coordinate system based on the reference image data obtained by the capturing and the positional relationship of the plurality of markers ep stored in the main body memory 303. At this time, the plurality of markers ep of the reference member 190 is identified based on the first and second markers ep1 and ep2.

After that, based on the calculated coordinates of the plurality of markers ep, the main body control circuit 302 generates, as the first position/posture information, the information indicating the position and the posture of the movable camera 120 fixed to the reference member 190 in the device coordinate system.

In the three-dimensional coordinate measuring device 1 according to the embodiment, a three-dimensional coordinate system (referred to below as the movable coordinate system) having a predetermined relationship with the movable camera 120 is predefined in addition to the device coordinate system described above. In addition, the main body memory 303 of the processing device 300 stores the relative positional relationship of the plurality of markers eq of the probe 200 in advance.

As described above, the movable camera 120 captures the plurality of markers eq of the probe 200. In this case, the main body control circuit 302 in FIG. 2 calculates the coordinates of the markers eq in the movable coordinate system based on the measurement image data obtained by capturing and the positional relationship of the plurality of markers eq stored in the main body memory 303.

After that, the main body control circuit 302 generates the information indicating the position and the posture of the probe 200 as the second position/posture information based on the calculated coordinates of the plurality of markers eq.

The reference camera 110 is fixed to the reference stand 10. Therefore, the device coordinate system does not change while the measurement target S is measured. In contrast, the movable camera 120 is provided rotatably so that the imaging visual field follows the movement of the probe 200. Accordingly, the relationship between the device coordinate system and the movable coordinate system changes as the movable camera 120 rotates.

Accordingly, in the embodiment, the main body control circuit 302 generates the third position/posture information indicating the position and the posture of the probe 200 in the device coordinate system based on the first and second position/posture information. That is, the main body control circuit 302 calculates the relationship of the movable coordinate system relative to the device coordinate system based on the first position/posture information and converts the second position/posture information to information that follows the device coordinate system based on the calculated relationship. This generates the third position/posture information.

After that, the main body control circuit 302 calculates the coordinate of the measurement point indicated by the probe 200 based on the generated third position/posture information and the positional relationship between the plurality of markers eq and the contact part 211*a* of the probe 200.

[5] Basic Measurement Example

Figure 10:
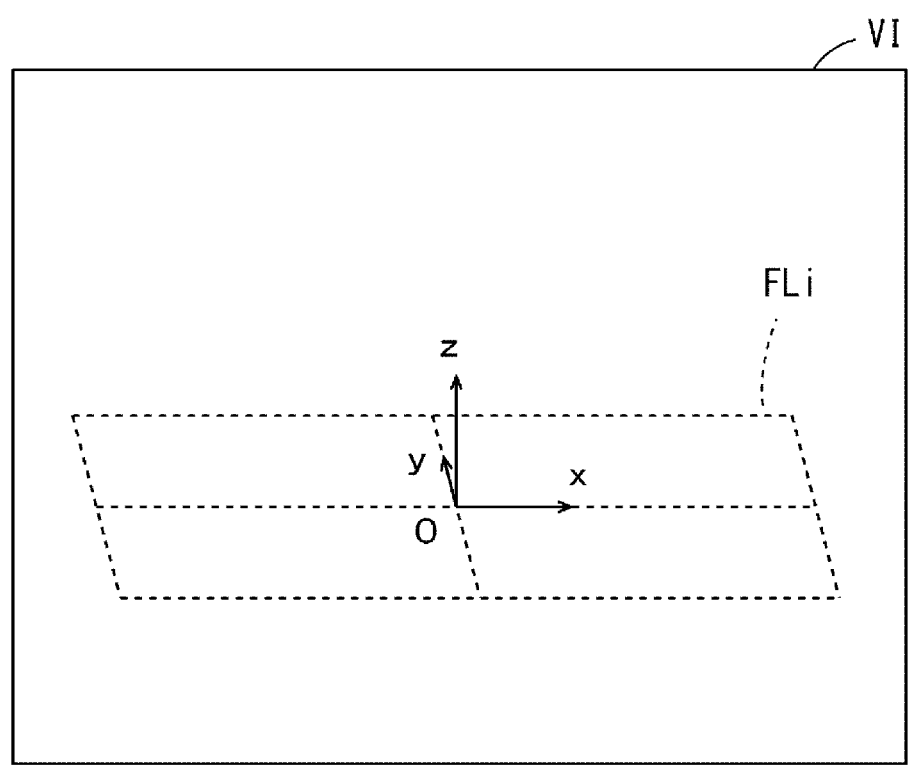
FIG. 10 illustrates an example of an image displayed in a main body display unit in FIG. 1.
Figure 11:
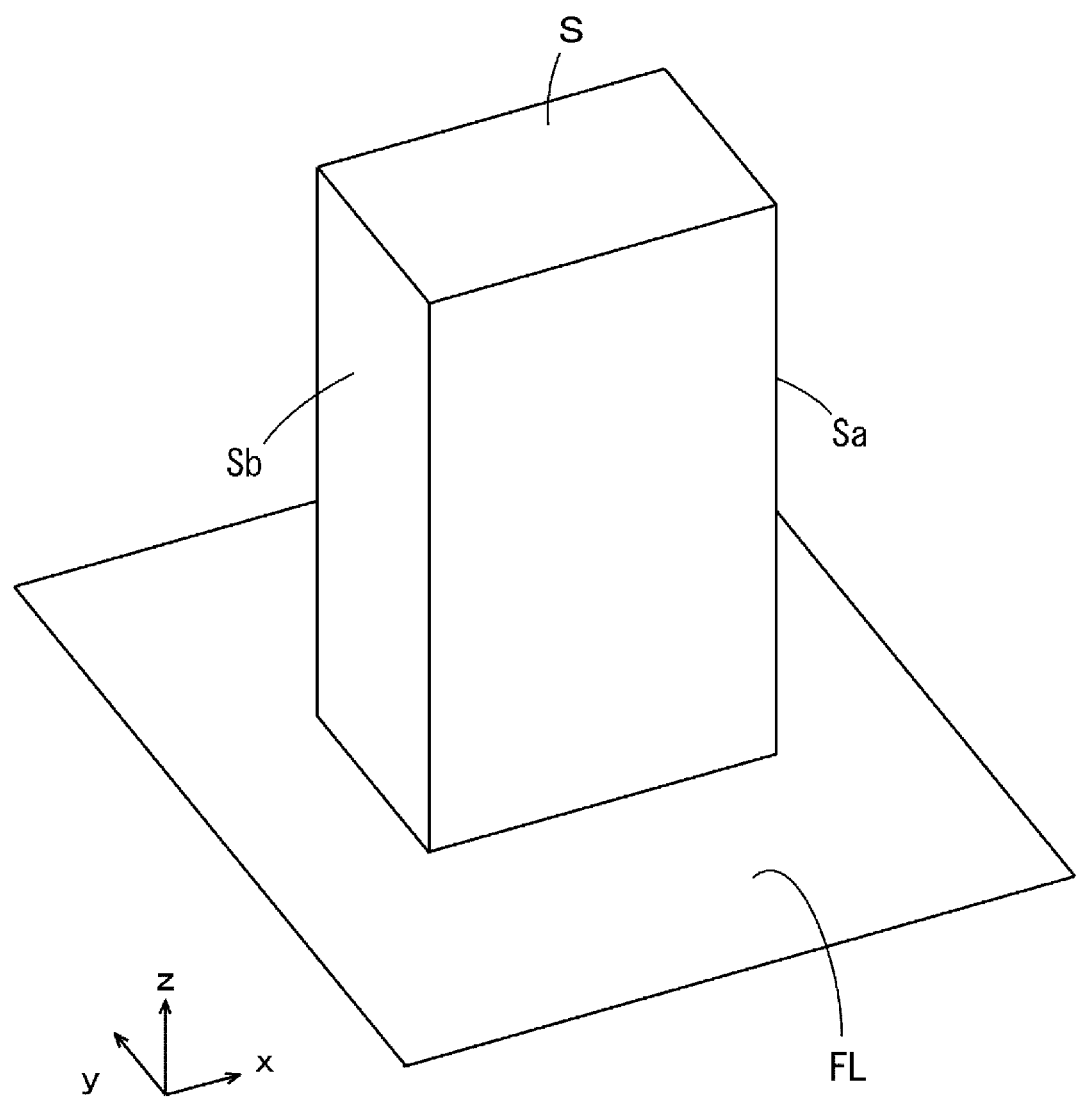
FIG. 11 illustrates an example of a measurement target.

A basic measurement example of the dimensions of the measurement target S by the three-dimensional coordinate measuring device 1 will be described. FIG. 10 illustrates an example of an image displayed on the main body display unit 310 in FIG. 1. FIG. 11 illustrates an example of the measurement target S.

FIG. 10 illustrates an image (referred to below as a measurement area virtual image) VI that virtually represents the area in which the dimensions of the measurement target S can be measured by the three-dimensional coordinate measuring device 1. In the three-dimensional coordinate measuring device 1 in this example, the x-axis and y-axis of the device coordinate system are set so as to be orthogonal to each other and parallel with a flat and horizontal virtual floor surface FL and the z-axis is set so as to be orthogonal to the floor surface FL.

In addition, a position on the floor surface FL which has a predetermined relationship with the imaging visual field of the movable camera 120 is set as an origin O of the device coordinate system. The measurement area virtual image VI in FIG. 10 includes the origin O, the x-axis, the y-axis, and the z-axis of the device coordinate system and includes a floor surface image FLi (see the portion indicated by the dotted line in FIG. 10) corresponding to the virtual floor surface FL.

The measurement target S in FIG. 11 has a rectangular parallelepiped shape. In this example, the distance between one side surface Sa and an opposite side surface Sb of the measurement target S is measured. The side surfaces Sa and Sb of the measurement target S are orthogonal to the x-axis.

Figure 12A:
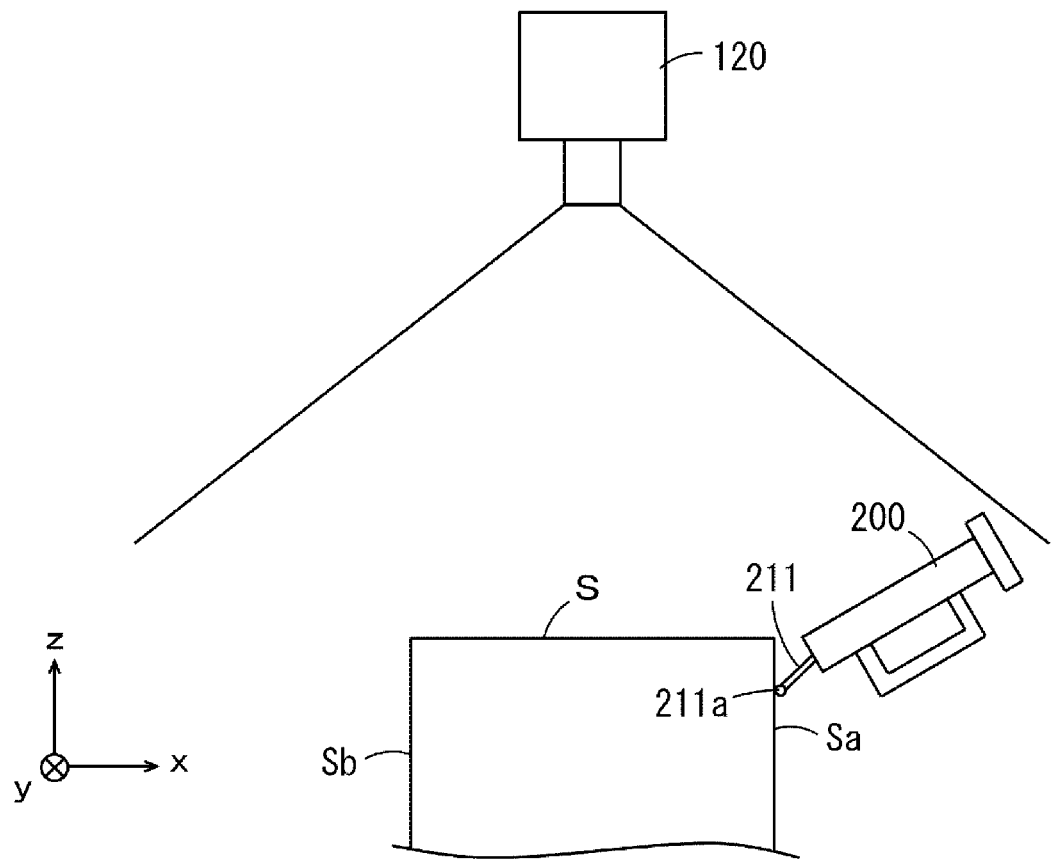
FIGS. 12A-12B illustrates a basic measurement example of the measurement target in FIG. 11.
Figure 12B:
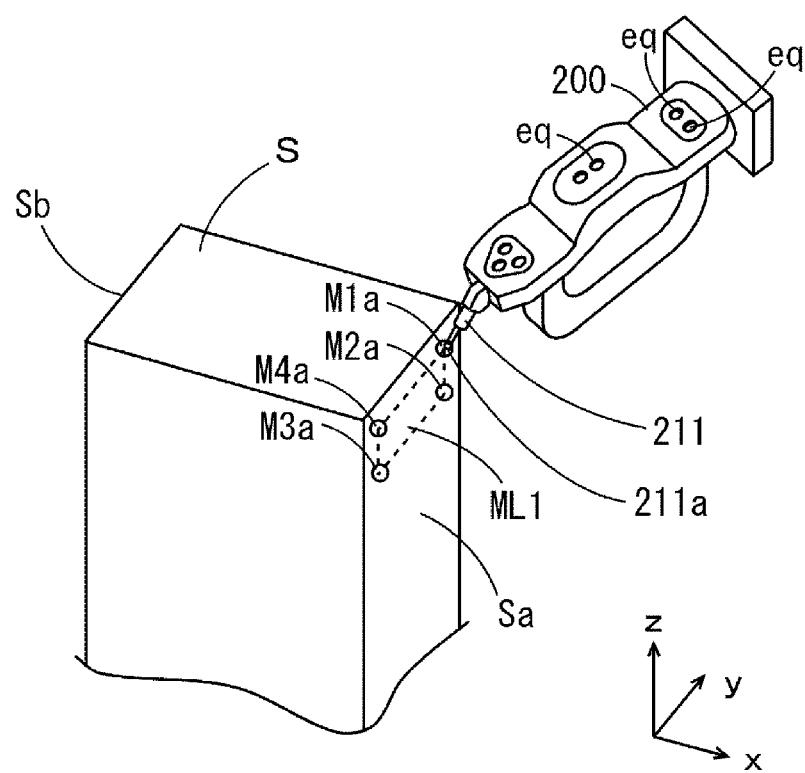
Figure 13:
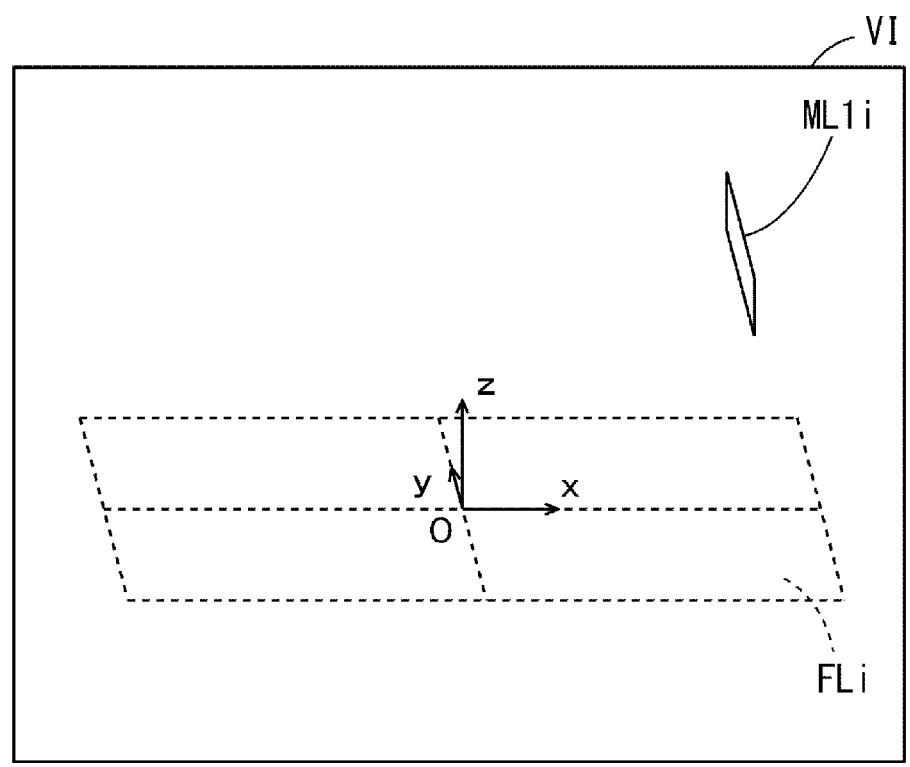
FIG. 13 illustrates a basic measurement example of the measurement target in FIG. 11.
Figure 14A:
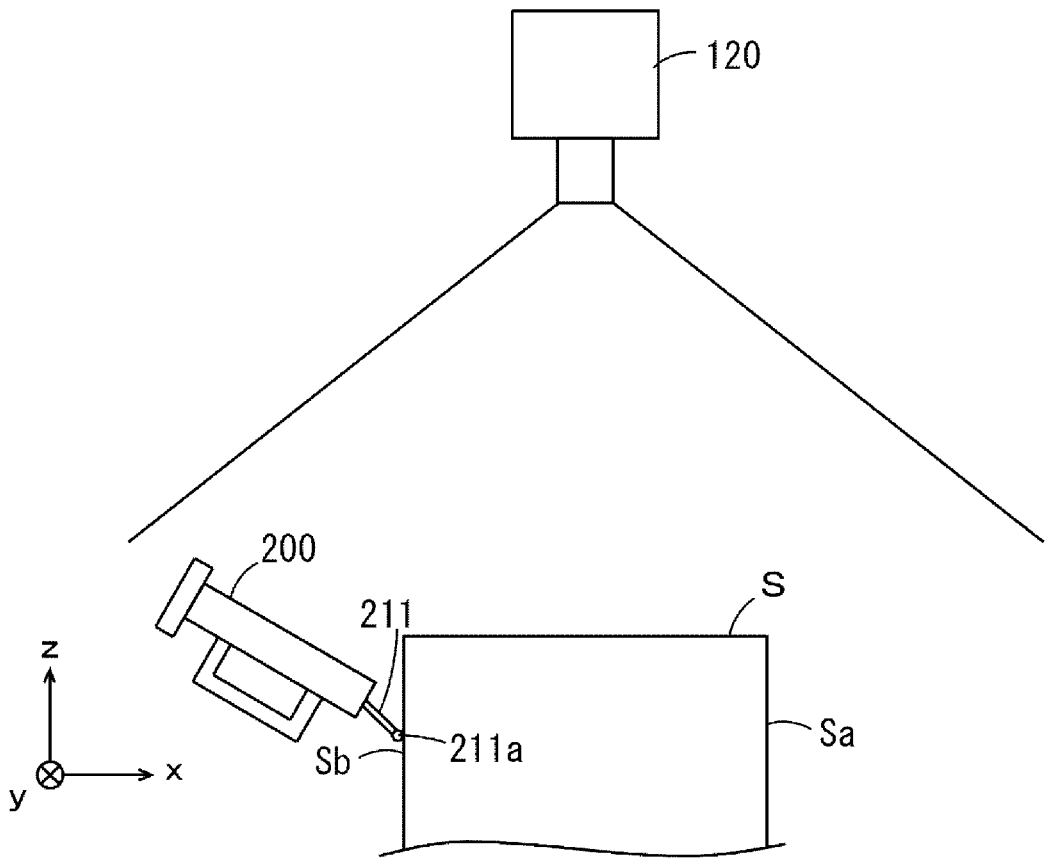
FIGS. 14A-14B illustrates a basic measurement example of the measurement target in FIG. 11.
Figure 14B:
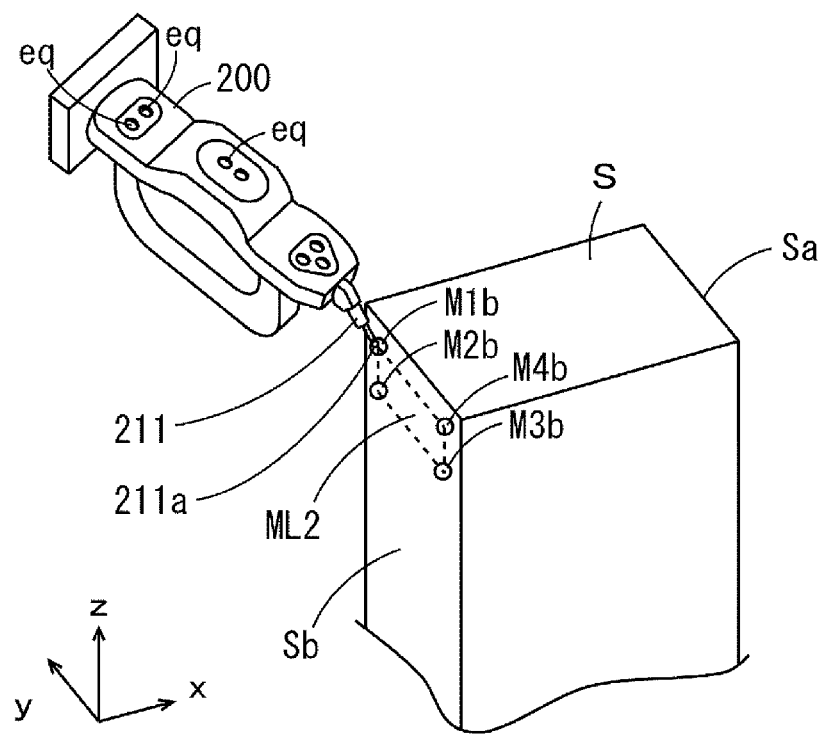
Figure 15:
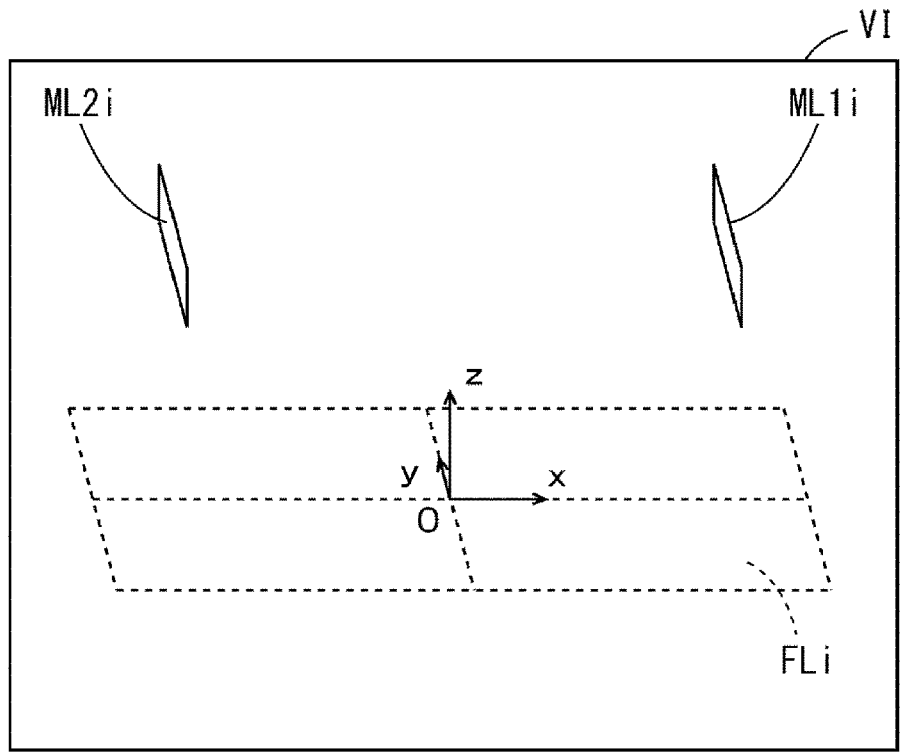
FIG. 15 illustrates a basic measurement example of the measurement target in FIG. 11.
Figure 16:
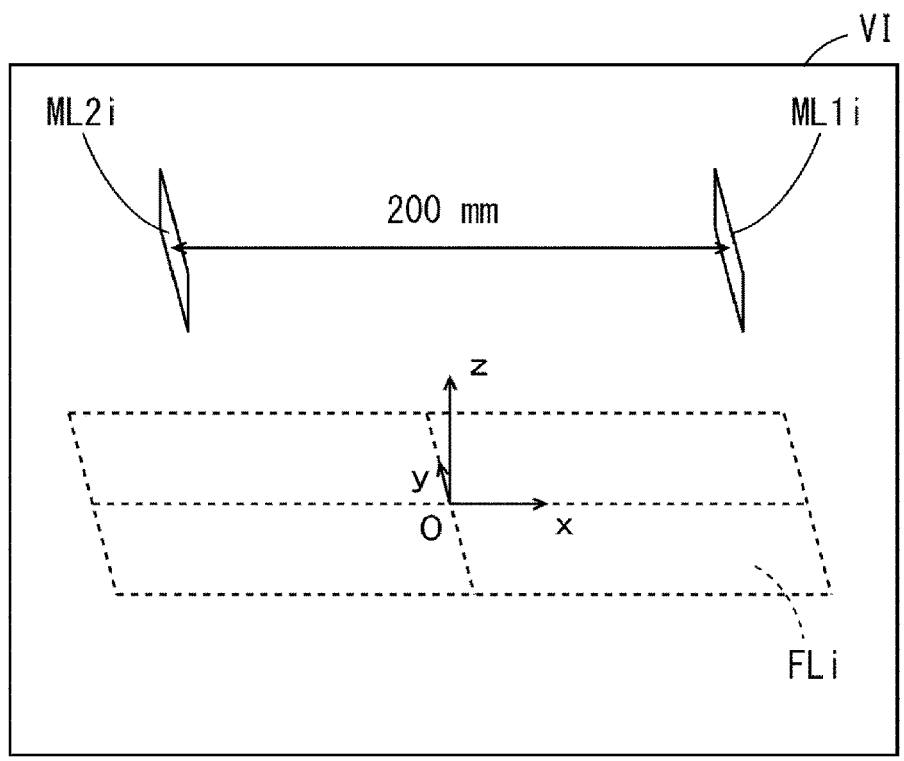
FIG. 16 illustrates a basic measurement example of the measurement target in FIG. 11.

FIG. 12 to FIG. 16 illustrate a basic measurement example of the measurement target S in FIG. 11. FIG. 12A and FIG. 14A illustrate the positional relationship between the movable camera 120, the probe 200, and the measurement target S and FIG. 12B and FIG. 14B are perspective views illustrating the external appearance of the probe 200 and the measurement target S. FIG. 13, FIG. 15, and FIG. 16 illustrate examples of the measurement area virtual image VI displayed on the main body display unit 310.

At the time of this measurement, the user U needs to specify the position and the shape of the portion (measurement target portion) to be measured of the measurement target S. Therefore, the user U selects the type (referred to below as a geometric element) of a geometric shape indicating the shape of the portion to be measured of the measurement target S by operating the main body operation unit 320 in FIG. 1 or the touch panel display 230 in FIG. 9. The geometric element includes a point, a straight line, a plane, a circle, a cylinder, a sphere, and the like.

For example, user U selects "plane" as a geometric element indicating the shape of the one side surface Sa of the measurement target S (selection operation of a geometric element). After that, the user U instructs a plurality of (three or more) measurement points on the side surface Sa of the measurement target S to specify the side surface Sa (instruction operation of measurement points).

Specifically, as illustrated in FIG. 12A and FIG. 12B, the user U brings the contact part 211*a* of the stylus 211 into contact with the side surface Sa of the measurement target S so that the plurality of markers eq of the probe 200 face the movable camera 120. In this state, the user U instructs the contact position between the measurement target S and the contact unit 211*a* as a measurement point M1*a* by depressing the probe operation unit 221 in FIG. 8. In this case, the coordinates of the measurement point M1*a* are calculated by the main control circuit 302 in FIG. 2 and the calculation result is stored in the main body memory 303 in FIG. 2.

Similarly, the user U instructs three different portions on the side surface Sa of the measurement target S as measurement points M2*a*, M3*a*, and M4*a*. This causes the main body control circuit 302 to calculate the coordinates of the measurement points M2*a*, M3*a*, and M4*a*. The calculation result is stored in the main body memory 303.

Subsequently, the user U sets the plane (referred to below as the measurement plane ML1) passing through the measurement points M1*a* to M4*a* as the measurement target portion corresponding to the side surface Sa of the measurement target S by operating the main body operation unit 320 in FIG. 2 or the touch panel display 230 in FIG. 8 (setting operation of the measurement target portion). This calculates the position of the measurement plane ML1 in the device coordinate system and stores the calculation result in a storage unit 210 as element specifying information. In this case, as illustrated in FIG. 13, an image ML1*i* indicating the set measurement plane ML1 is superimposed on the measurement area virtual image VI.

Here, in the embodiment, the element specifying information indicates, using the device coordinate system, a measurement target portion on the measurement target S specified based on the geometric element selected by the user U and the measurement point instructed by the user U.

Subsequently, the user U selects "plane" as the geometric element indicating the shape of the other side surface Sb of the measurement target S (selection operation of a geometric element). After that, the user U instructs a plurality of (three or more) measurement points on the side surface Sb of the measurement target S to specify the side surface Sb (instruction operation of measurement points).

Specifically, as illustrated in FIG. 14A and FIG. 14B, the user U brings the contact part 211a of the stylus 211 into contact with the side surface Sb of the measurement target S so that the plurality of markers eq of the probe 200 faces the movable camera 120. The user U depresses the probe operation unit 221 in FIG. 8 in this state to instruct the contact position between the measurement target S and the contact part 211a as a measurement point M1b. In this case, the coordinates of the measurement point M1b are calculated by the main body control circuit 302 in FIG. 2 and the calculation result is stored in the main body memory 303 in FIG. 2.

Similarly, the user U instructs three different portions on the side surface Sb of the measurement target S as measurement points M2b, M3b, and M4b. This causes the main control circuit 302 to calculate the coordinates of the measurement points M2b, M3b, and M4b. The calculation result is stored in the main body memory 303.

Subsequently, the user U sets the plane (referred to below as a measurement plane ML2) passing through the measurement points M1b to M4b as the measurement target portion corresponding to the side surface Sb of the measurement target S by operating the main body operation unit 320 in FIG. 2 or the touch panel display 230 in FIG. 8 (setting operation of the measurement target portion). This calculates the position of the measurement plane ML2 in the device coordinate system and stores the calculation result in the storage unit 210 as element specifying information. In this case, as illustrated in FIG. 15, the image ML2i indicating the measurement plane ML2 is superimposed on the measurement area virtual image VI in addition to the image ML1i indicating the measurement plane ML1.

After specifying the measurement target portion of the measurement target S as described above, the user U needs to set what to measure about which measurement target portion by operating the main body operation unit 320 in FIG. 1 or the touch panel display 230 in FIG. 8. Here, the user U selects the type of the measurement item of the measurement target S (selection operation of the measurement item) and selects one of the measurement target portions required to obtain the value of this measurement item (selection operation of the measurement target portion) by operating the main body operation unit 320 in FIG. 1 or the touch panel display 230 in FIG. 8. It should be noted here that the type of the measurement item includes various physical quantities such as an angle and a distance.

In this example, the user U selects the distance as the type of the measurement item. In addition, the user U selects the two measurement planes ML1 and ML2 as the measurement target portions between which the distance is obtained.

By selecting the measurement item and selecting the measurement target portions, the measurement item is calculated using the element specifying information stored in the main body memory 303. In this example, the distance between the two selected measurement target portions (measurement planes ML1 and ML2) is calculated. The calculation result is stored in the main body memory 303 as the measurement result.

At this time, as illustrated in FIG. 16, the measurement result is displayed in the measurement area virtual image VI. It should be noted here that the measurement result may be displayed in the main body display unit 310 separately from the measurement area virtual image VI. In addition, the calculation method for the distance between the measurement planes ML1 and ML2 may be set as appropriate by the user U.

Although one plane is set as the measurement target portion based on four measurement points in the example described above, one plane may be set as the measurement target portion based on at least three measurement points. In contrast, when four or more measurement points are instructed to set one plane, the flatness of a plane set as the measurement target portion may be obtained.

In addition, although the distance is selected as the type of measurement item after the two measurement planes ML1 and ML2 are set as the measurement target portions in the above example, the angle may be selected instead of the distance as the type of measurement item. In this case, the angle formed by the measurement planes ML1 and ML2 is measured instead of the distance between the measurement planes ML1 and ML2.

[6] Examples of Screen Display of the Main Body Display Unit 310 and the Touch Panel Display 230

As described above, when measuring the measurement target S, the user U performs the selection operation of a geometric element, the instruction operation of measurement points, the setting operation of a measurement target portion based on the geometric element and the measurement points, the selection operation of a measurement item, and the selection operation of the measurement target portion.

In addition, in the three-dimensional coordinate measuring device 1 according to embodiment, the user U can also measure a desired geometric tolerance about a desired part of the measurement target S. In this case, the user U selects a desired geometric tolerance from a plurality of types of geometric tolerances. This calculates the selected type of geometric tolerance of the measurement target portion specified from the plurality of measurement points instructed by the user. The geometric tolerance represents the deviation of the shape of the measurement target portion specified by the one or more measurement points on the measurement target S from the geometrically correct shape. That is, the geometric tolerance represents the degree of deviation of the shape of the measurement target portion from the geometrically correct shape. As described above, when measuring the geometric tolerance, the user U performs the selection operation of the geometric tolerance.

FIG. 17 illustrates the relationship between main screen generation data and sub screen generation data stored in the main body memory 303 in FIG. 2 and the probe memory 205 in FIG. 8, respectively, and the operation of the three-dimensional coordinate measuring device 1 by the user U.

As illustrated in FIG. 17, the main body memory 303 stores first to fourth main screen generation data as a plurality types of main screen generation data. In addition, the probe memory 205 stores first to fourth sub screen generation data as a plurality of types of sub screen generation data. Each of the first to fourth main screen generation data and the first to fourth sub screen generation data includes background image data indicating the backgrounds of screens to be displayed on the main body display unit 310 or the touch panel display 230, data for displaying predetermined icons in an area in background images, data for indicating the processing to be performed by operating an area in background images, data for displaying various measurement results calculated by the main body control circuit 302 in other areas on background images, and the like.

The first main screen generation data and the first sub screen generation data are associated with a selection operation of a geometric element and a selection operation of a measurement item. This causes the main body control circuit 302 in FIG. 2 to generate first main screen data for indicating the screen to be displayed on the main body display unit 310 based on the first main screen generation data at the time of standby for accepting a selection operation of a geometric element and a selection operation of a measurement item. In addition, the probe control unit 201 in FIG. 8 generates first sub screen data indicating the screen to be displayed on the touch panel display 230 based on the first sub screen generation data in synchronization with the generation of the first main screen data of the main body control circuit 302. In the following description, the screen to be displayed on the main body display unit 310 based on the first main screen data is referred to as a first main screen and the screen to be displayed on the touch panel display 230 based on the first sub screen data is a first sub screen.

The second main screen generation data and the second sub screen generation data are associated with an instruction operation of the measurement point and a setting operation of a measurement target portion. This causes the main control circuit 302 in FIG. 2 generates second main screen data for indicating the screen to be displayed on the main body display unit 310 based on the second main screen generation data at the time of standby for accepting an instruction operation of a measurement point and a setting operation of a measurement target portion. In addition, the probe control unit 201 in FIG. 8 generates second sub screen data for indicating the screen to be displayed on the touch panel display 230 based on the second sub screen generation data in synchronization with the generation of the second main screen data of the main body control circuit 302. In the following description, the screen to be displayed on the main body display unit 310 based on the second main screen data is referred to as a second main screen and the screen to be displayed on the touch panel display 230 based on the second sub screen data is referred to as a second sub screen.

The third main screen generation data and the third sub screen generation data are associated with a selection operation of a measurement target portion. This causes the main body control circuit 302 in FIG. 2 to generate third main screen data for indicating the screen to be displayed on the main body display unit 310 based on the third main screen generation data at the time of standby for accepting a selection operation of a measurement target portion. In addition, the probe control unit 201 in FIG. 8 generates third sub screen data for indicating the screen to be displayed on the touch panel display 230 based on the third sub screen generation data in synchronization with the generation of the third main screen data of the main body control circuit 302. In the following description, the screen to be displayed on the main body display unit 310 based on the third main screen data is referred to as a third main screen and the screen to be displayed on the touch panel display 230 based on the third sub screen data is referred to as a third sub screen.

The fourth main screen generation data and the fourth sub screen generation data are associated with a selection operation of a geometric tolerance. This causes the main body control circuit 302 in FIG. 2 to generate fourth main screen data for indicating the screen to be displayed on the main body display unit 310 based on the fourth main screen generation data at the time of standby for accepting a selection operation of a geometric tolerance. In addition, the probe control unit 201 in FIG. 8 generates fourth sub screen data for indicating the screen to be displayed on the touch panel display 230 based on the fourth sub screen generation data in synchronization with the generation of the fourth main screen data of the main body control circuit 302. In the following description, the screen to be displayed on the main body display unit 310 based on the fourth main screen data is referred to as a fourth main screen and the screen to be displayed on the touch panel display 230 based on the fourth sub screen data is referred to as a fourth sub screen.

In the three-dimensional coordinate measuring device 1, the user U uses the main body operation unit 320 in FIG. 2 or the touch panel display 230 in FIG. 8 to performs a selection operation of a geometric element, a setting operation of a measurement target portion, a selection operation of a measurement item, a selection operation of a measurement target portion, and a selection operation of a geometric tolerance. In addition, the user U uses the probe operation unit 221 of the probe 200 to perform an instruction operation of a measurement point.

Figure 18A:
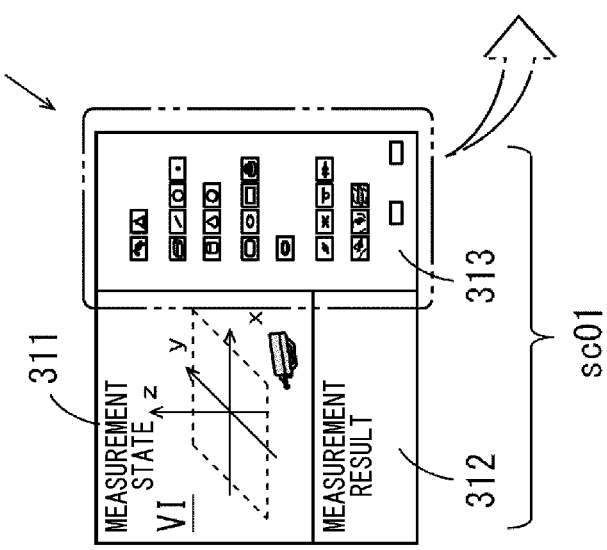
FIGS. 18A-18B illustrates display examples of a first main screen and a first sub screen displayed on a main body display unit in FIG. 2 and a touch panel display in FIG. 8 at the time of selection operations of a geometric element and a measurement item.
Figure 18B:
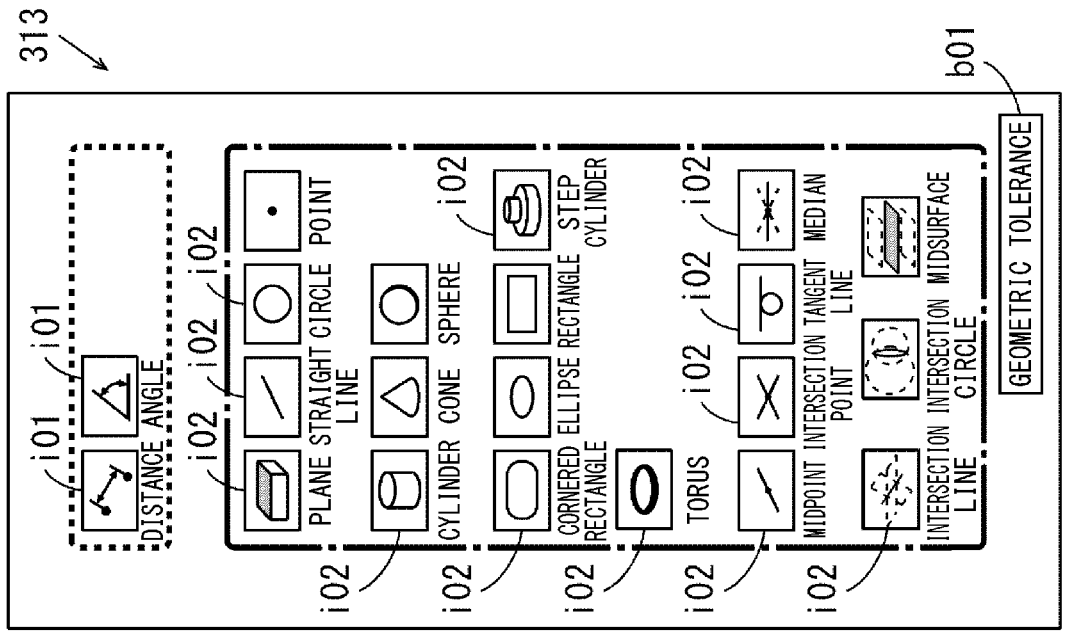

FIGS. 18A and 18B illustrate display examples of the first main screen and the first sub screen displayed on the main body display unit 310 in FIG. 2 and the touch panel display 230 in FIG. 8 in selection operations of a geometric element and a measurement item. In a first main screen sc01 and second to fourth main screens sc02 to sc04 (FIG. 19 to FIG. 21) described later, the display area of the main body display unit 310 is divided into a measurement state display area 311, a result display area 312, and an operation display area 313.

The measurement state display area 311 is an area in which the measurement area virtual image VI described above is displayed. In the measurement area virtual image VI, the position and the posture of the probe 200 calculated by capturing the probe 200 using the movable camera 120 are virtually superimposed. The result display area 312 is an area in which measurement results are mainly displayed. Accordingly, no information is displayed in the result display area 312 of the first main screen sc01 in FIG. 18A. The operation display area 313 is an area in which at least one of an icon, button, and input field to be operated by the user is displayed.

FIG. 18A illustrates an enlarged view of the operation display area 313 in the first main screen sc01 together with a display example of the entire first main screen sc01. In the operation display area 313 of the first main screen sc01, as indicated in the bold dotted line frame, a plurality of (two in this example) item icons i01 corresponding to a plurality of predetermined measurement items, respectively, is displayed. The two item icons i01 in this example correspond to the measurement items "distance" and "angle", respectively.

In addition, as indicated in the thick dot-dash line frame in the operation display area 313 of the first main screen sc01, a plurality of (19 in this example) element icons i02 corresponding to a plurality of predetermined geometric elements, respectively, is displayed. The plurality of element icons i02 includes seven element icons i02 corresponding to the geometric elements "plane", "straight line", "circle", "point", "cylinder", "cone", and "sphere", respectively. In the following description, these seven element icons i02 are referred to as basic element icons.

The plurality of element icons i02 further includes 12 element icons i02 corresponding to the geometric elements "cornered rectangle", "ellipse", "rectangle", "step cylinder", "torus", "midpoint", "intersection point", "tangent line", "median", "intersection line", "intersection circle", and "midsurface", respectively. In the following description, all element icons i02 excluding the basic element icons are referred to as special element icons.

As indicated in the example described above, the special element icons include geometric elements specified based on the positional relationship between a plurality of geometric elements, such as "intersection line", "intersection circle", and "midsurface".

The user U can select the desired element icon i02 from the plurality of element icons i02 using the main body operation unit 320 in FIG. 2 as a selection operation of a geometric element. In addition, the user U can select the desired item icon i01 from the plurality of item icons i01 using the main body operation unit 320 in FIG. 2 as a selection operation of a measurement element.

In the operation display area 313 of the first main screen sc01, a geometric tolerance button b01 is further displayed. The geometric tolerance button b01 changes the state of the three-dimensional coordinate measuring device 1 so as to accept the selection operation of a geometric tolerance. In the state in which the first main screen sc01 is displayed on the main body display unit 310, the user U can operate the geometric tolerance button b01 from the main body operation unit 320 to perform a selection operation of a geometric tolerance.

As illustrated in FIG. 18B, in a first sub screen sc11 of the touch panel display 230, a plurality of (two in this example) item icons i11 corresponding to a plurality of measurement items, respectively, is displayed as indicated in the bold dotted line frame in FIG. 18B. The two item icons i11 in this example correspond to the measurement items "distance" and "angle", respectively, as the two item icons i01 displayed on the first main screen sc01.

In addition, on the first sub screen sc11, as indicated in the bold dot-dash line frame in FIG. 18B, a plurality of (seven in this example) element icons i12 corresponding to a plurality of geometric elements, respectively, is displayed. The seven element icons i12 in this example correspond to the geometric elements "plane", "straight line", "circle", "point", "cylinder", "cone", and "sphere", respectively, as the seven basic element icons displayed on the first main screen sc01. However, the element icons corresponding to the 12 special element icons displayed on the first main screen sc01 are not displayed on the first sub screen sc11.

The user U can select the desired element icon i12 from the plurality of element icons i12 using the touch panel display 230 in FIG. 8 as a selection operation of a geometrical element. In addition, the user U can select the desired item icon i11 from the plurality of item icons i11 using the touch panel display 230 in FIG. 8 as a selection operation of a measurement item.

On the first sub screen sc11, a geometric tolerance button b11 is further displayed. As in the example of the first main screen sc01, in the state in which the first sub screen sc11 is displayed on the touch panel display 230, the user U can operate the geometric tolerance button b11 on the touch panel display 230 to perform a selection operation of a geometric tolerance.

When one of the plurality of element icons i02 and i12 displayed on the first main screen sc01 and the first sub screen sc11 is selected, the three-dimensional coordinate measuring device 1 enters a standby state for accepting an instruction operation of a measurement point and a setting operation of a measurement target portion. This switches the first main screen sc01 displayed on the main body display unit 310 to the second main screen and switches the first sub screen sc11 displayed on the touch panel display 230 to the second sub screen.

Figure 19A:
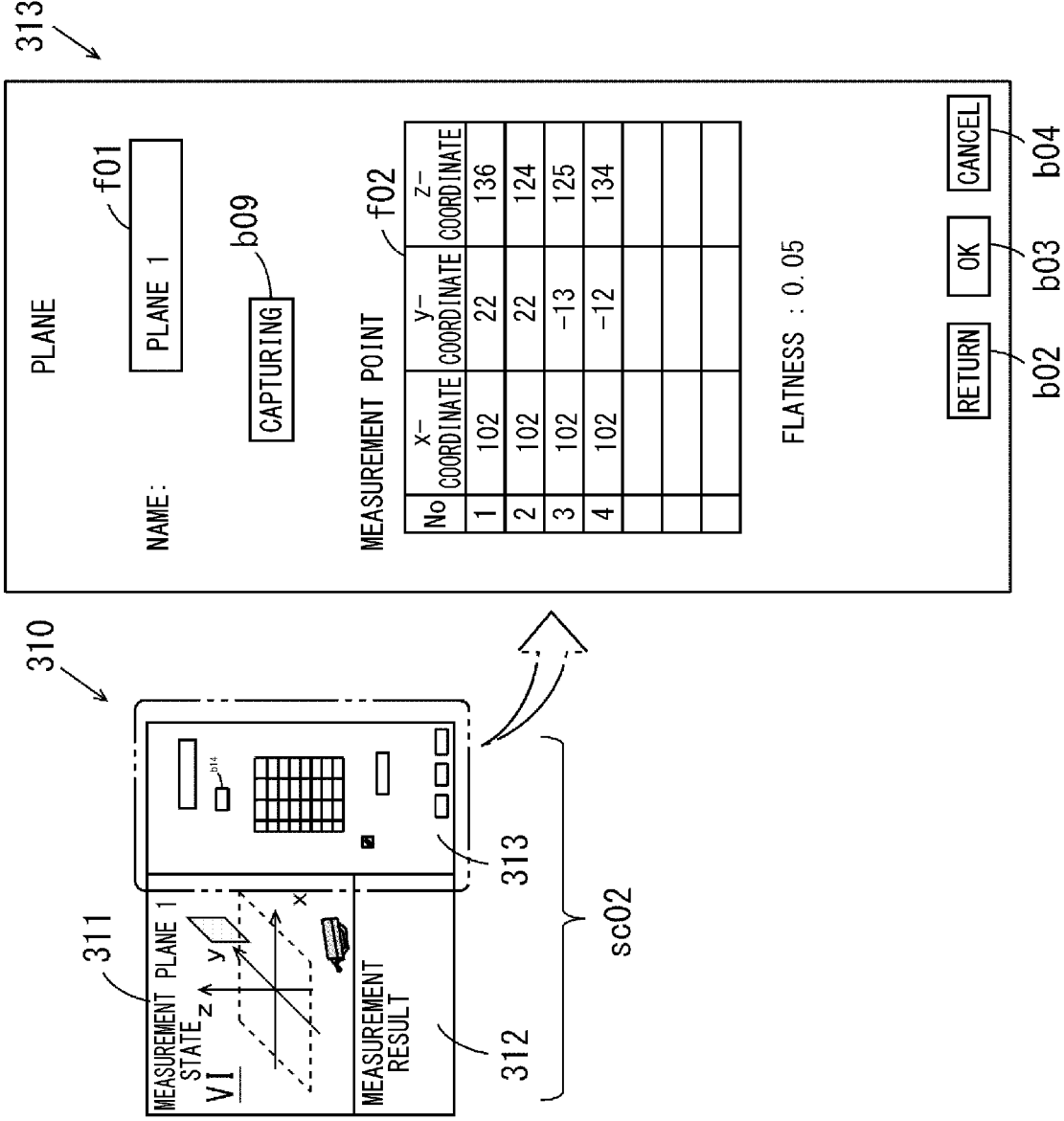
FIGS. 19A-19B illustrates display examples of a second main screen and a second sub screen displayed on the main body display unit in FIG. 2 and the touch panel display in FIG. 8 at the time of an instruction operation of measurement points and a setting operation of a measurement target portion.
Figure 19B:
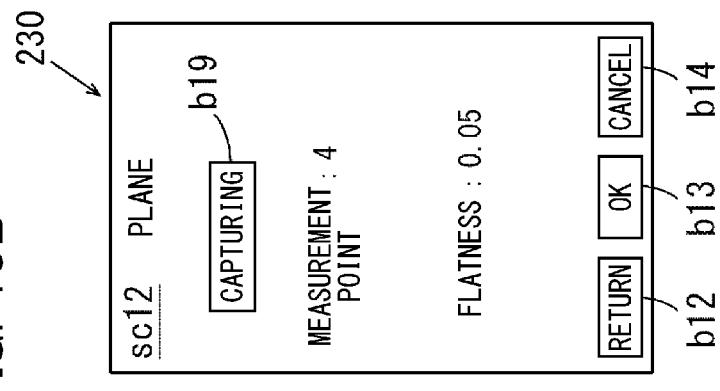

FIGS. 19A and 19B are display examples of the second main screen and the second sub screen displayed on the main body display unit 310 in FIG. 2 and the touch panel display 230 in FIG. 8 at the time of an instruction operation of a measurement point and a setting operation of a measurement target portion. In this example, it is assumed that "plane" is selected as the geometric element for setting the measurement target portion.

FIG. 19A illustrates an enlarged view of the operation display area 313 in the second main screen sc02 is shown together with a display example of the entire second main screen sc02. In the operation display area 313 of the second main screen sc02, a name input field f01 in which the name of a measurement target portion to be set is displayed. At the time of switching from the first main screen sc01 to the second main screen sc02, the name input field f01 displays the name of the measurement target portion temporarily determined according to a predetermined method. Here, the user U can maintain the name displayed in the name input field f01 or change the name to a desired name using the main body operation unit 320. In this example, "plane 1" is input in the name input field f01.

In addition, an capturing button b09 is displayed in the operation display area 313 of the second main screen sc02. The user U can perform capturing using the probe camera 208 in FIG. 8 provided in the probe 200 by operating the capturing button b09. The image data generated by the capturing is stored in the main body memory 303 in FIG. 2 together with the measurement result.

In addition, a measurement point coordinate display field f02 is displayed in the operation display area 313 of the second main screen sc02. The measurement point coordinate display field f02 sequentially displays the coordinates of a measurement point obtained by an instruction operation of a measurement point. In this example, four measurement points are specified to set a specific plane on the measurement target S as a measurement target portion. Accordingly, the coordinates of the four measurement points are displayed in the measurement point coordinate display field f02.

In addition, in the operation display area 313 of the second main screen sc02, as information obtained based on the plurality of instructed measurement points, the flatness calculated based on the coordinates of the plurality of measurement points is displayed together with the coordinates of the plurality of measurement points.

In the operation display area 313 of the second main screen sc02, a return button b02, an OK button b03, and a cancel button b04 are further displayed. The return button b02 is used to return the state of the three-dimensional coordinate measuring device 1 so as to accept selection operations of a geometric element and a measurement item without setting the measurement target portion. The OK button b03 is used to instruct the completion of the specification of all measurement points for setting a specific target portion to the three-dimensional coordinate measuring device 1. By operating the OK button b03, a specific target portion is set based on the geometric element selected immediately before and one or more of measurement points obtained by an instruction operation for the measurement points. The cancel button b04 is used to delete the information of a measurement point obtained by the instruction operation of the measurement point performed immediately before.

As illustrated in FIG. 19B, on a second sub screen sc12 of the touch panel display 230, a capturing button b19, a return button b12, an OK button b13, and a cancel button b14 that correspond to the capturing button b09, the return button b02, the OK button b03, and the cancel button b04, respectively, displayed on the second main screen sc02 are displayed.

It should be noted here that the name input field f01 in which the name of a measurement target portion is input is not displayed on the second sub screen sc12. Accordingly, when a measurement target portion is set by the probe 200, the name of a measurement target portion is determined in a predetermined method for each setting.

The second sub screen sc12 displays the number of measurement points instructed since the start of the instruction operation of measurement points to set a specific target portion in addition to the various buttons described above. This example indicates that the fourth measurement point has been instructed. In addition, on the second sub screen sc12, the coordinates of the plurality of instructed measurement points and the flatness calculated based on the coordinates of the plurality of measurement points as information obtained based on the plurality of measurement points are displayed.

When the specific target portion is set by one of the second main screen sc02 and the second sub screen sc12, the second main screen sc02 displayed on the main body display unit 310 is switched to the first main screen sc01 and the second sub screen sc12 displayed on the touch panel display 230 is switched to the first sub screen sc11.

When one of the plurality of item icons i01 and i11 displayed on the first main screen sc01 and the first sub screen sc11 in FIG. 18 is selected after one or more specific target portions are set, the three-dimensional coordinate measuring device 1 enters a standby state for accepting a selection operation of a measurement target portion. This switches the first main screen sc01 displayed on the main body display unit 310 to the third main screen and switches the first sub screen sc11 displayed on the touch panel display 230 to the third sub screen.

Figure 20B:
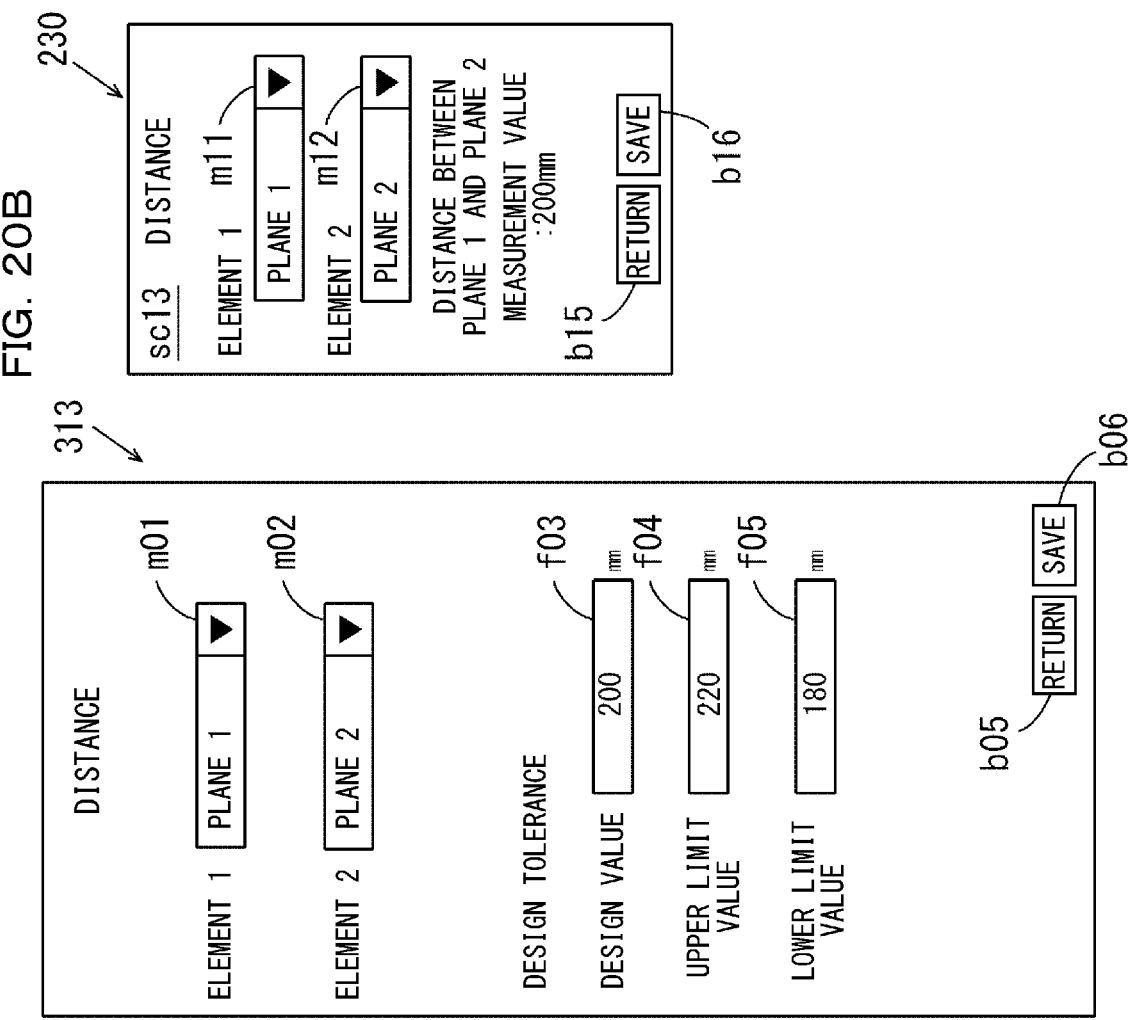
FIGS. 20A-20B illustrates display examples of a third main screen and a third sub screen displayed on the main body display unit in FIG. 2 and the touch panel display in FIG. 8 at the time of a selection operation of the measurement target portion.
Figure 20A:
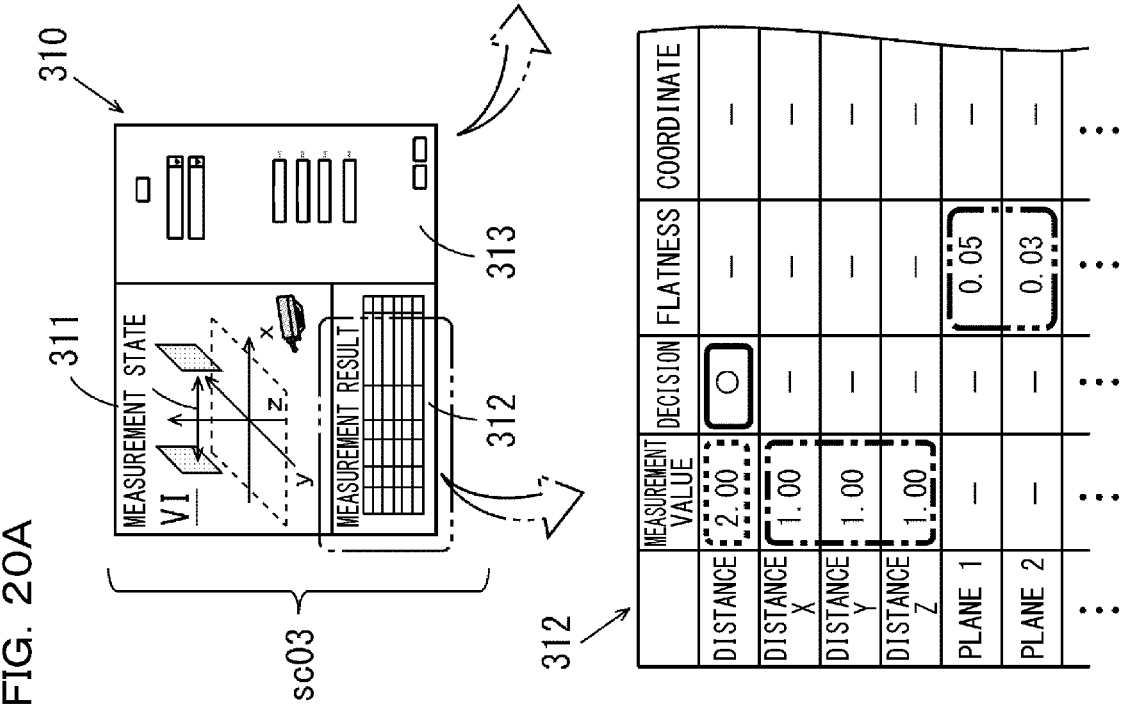

FIGS. 20A and 20B illustrate display examples of the third main screen and the third sub screen displayed on the main body display unit 310 in FIG. 2 and the touch panel display 230 in FIG. 8 at the time of a selection operation of a measurement target portion. In the examples, it is assumed that "distance" is selected as the measurement item. In addition, in this example, it is assumed that "plane 1" and "plane 2" are set in advance as measurement target portions.

FIG. 20A illustrates display examples of an entire third main screen sc03 and an enlarged view of the operation display area 313 of the third main screen sc03. In addition, FIG. 20A illustrates a partial enlarged view of the result display area 312 of the main measurement screen sc03.

In the operation display area 313 of, the third main measurement screen sc03, pull-down menus m01 and m02, a design value input field f03, an upper limit value input field f04, and a lower limit value input field f05 are displayed.

The pull-down menus m01 and m02 are operated by the user to select the measurement target portion required to obtain the "distance" selected as the measurement item. In this example, "plane 1" and "plane 2" are selected as the two measurement target portions for calculating the distance.

Here, the user U can input a predetermined design value in the design value input field f03 as the distance between "plane 1" and "plane 2". In addition, the user U can input the upper limit value and the lower limit value of the tolerance with respect to the design value (referred to below as the design tolerance) in the upper limit value input field f04 and the lower limit value input field f05. This sets the design tolerances.

In the operation display area 313 of the third main screen sc03, a return button b05 and a save button b06 are further displayed. The return button b05 is used to return the state of the three-dimensional coordinate measuring device 1 so as to accept selection operations of a geometric element and a measurement item. The save button b06 is used to store, in the main body memory 303, the value (distance in this example) of a measurement item calculated by selecting a measurement target portion.

As described above, when a measurement target portion is selected in the operation display region 313, the result display region 312 of the third main screen sc03 displays, as the measurement result, various types of information calculated based on the selected measurement item and measurement target portion.

In the result display area 312 of the third main screen sc03 in FIG. 20A, as indicated in the bold dotted line frame, the measured value of the measurement target S corresponding to the distance between "plane 1" and "plane 2" selected by the pull-down menus m01 and m02 is displayed. In addition, as indicated in the bold solid line frame in FIG. 20A, the decision result as to whether the measured value is present within the range of the design tolerance set using the design value input field f03, the upper limit value input field f04, and the lower limit value input field f05 of the operation display area 313 is displayed. In addition, as indicated in the bold dot-dash line frame in FIG. 20A, the components (lengths) corresponding to the three directions of the device coordinate system, respectively, with respect to the measured distance are displayed.

In addition, in the result display area 312, the flatness of "plane 1" and "plane 2" of the selected measurement target portion is displayed as the information related to the measurement result as indicated in the bold dot-dot-dash line frame in FIG. 20A.

As illustrated in FIG. 20B, on a third sub screen sc13 of the touch panel display 230, pull-down menus m11 and m12, a return button b15, and a save button b16 that correspond to the pull-down menus m01 and m02, the return button b05, and the save button b06, respectively, displayed on the third main screen sc03 are displayed.

On the third sub screen sc13, the measured value of the measurement target S calculated from the selected measurement target portion is displayed by selecting the measurement target portion using the pull-down menus m11 and m12.

When the measured value of the measurement target S is stored in the main body memory 303 by one of the third main screen sc03 and the third sub screen sc13, the third main screen sc03 displayed on, the main body display unit 310 is switched to the first main screen sc01 and the third main screen sc03 displayed on the touch panel display 230 is switched to the first sub screen sc11.

When one of the geometric tolerance buttons b01 and b11 displayed on the first main screen sc01 and the first sub screen sc11 in FIG. 18 is operated, the three-dimensional coordinate measuring device 1 enters a standby state for accepting a selection operation of a geometric tolerance. This switches the first main screen sc01 displayed in the main body display unit 310 to the fourth main screen and switches the first sub screen sc11 displayed in the touch panel display 230 to the fourth sub screen.

FIGS. 21A and 21B illustrate display examples of the fourth main screen and the fourth sub screen displayed on the main body display unit 310 in FIG. 2 and the touch panel display 230 in FIG. 8 at the time of a selection operation of a geometric tolerance.

FIG. 21A illustrates an enlarged view of the operation display area 313 in the fourth main screen sc04 together with a display example of the entire fourth main screen sc04. As illustrated in FIG. 21A, at the time of a selection operation of a geometric tolerance, a plurality (11 in this example) of geometric tolerance icons i03 corresponding to a plurality of geometric tolerances, respectively, is displayed in the operation display area 313 of the fourth main screen sc04. The 11 geometric tolerance icons i03 in this example correspond to the geometric tolerances "flatness", "roundness", "straightness", "cylindricality", "parallelism", "perpendicularity", "obliquity", "position", "concentricity", "coaxiality", and "symmetricity", respectively. The user U can select the desired geometric tolerance icon i03 from the plurality of geometric tolerance icons i03 by operating the main body operation unit 320 in FIG. 2.

In the operation display area 313 of the fourth main screen sc04, a return button b07 is further displayed. The return button b07 is used to return the state of the three-dimensional coordinate measuring device 1 so as to accept selection operations of a geometric element and a measurement item.

As illustrated in FIG. 21B, on a fourth sub screen sc14 of the touch panel display 230, a plurality of (four in this example) geometric tolerance icons i13 corresponding to the plurality of geometric tolerances, respectively, are displayed and a return button b17 is displayed. The four geometric tolerance icons i13 in this example correspond to the four geometric tolerance icons i03 of the 11 geometric tolerance icons i03 displayed on the fourth main screen sc04, respectively. In addition, the return button b17 in this example corresponds to the return button b07 displayed on the fourth main screen sc04.

The user U can select the desired geometric tolerance icon i13 from the plurality of geometric tolerance icons i13 by operating the touch panel display 230 in FIG. 8.

When selecting a geometric tolerance, the user U needs to set the measurement target portion of the geometric element corresponding to the selected geometric tolerance. Therefore, when one of the plurality of geometric tolerance icons i03 and i13 displayed on the fourth main screen sc04 and the fourth sub screen sc14 is selected, the three-dimensional coordinate measuring device 1 enters a standby state for accepting a selection operation of the measurement target portion.

This switches the screen displayed on the main body display unit 310 from the first main screen sc01 to the second main screen sc02 and switches the screen displayed on the touch panel display 230 from the first sub screen sc11 to the second sub screen sc12. In this case, when the measurement target portion corresponding to the selected geometric tolerance is set, the geometric tolerance of the set measurement target portion is calculated. The calculated geometric tolerance is displayed on the second main screen sc02 and the second sub screen sc12.

For example, when "flatness" is selected as the geometric tolerance and the flat portion of the measurement target S is set as the measurement target portion, the flatness of the set measurement target portion is calculated.

As described above, on the first main screen sc01, the user U can select a desired measurement item and geometric element from all of the predetermined measurement items and geometric elements in the three-dimensional coordinate measuring device 1. On the other hand, on the first sub screen sc11, the user U can select a desired measurement item and geometric element from some measurement items and geometric elements of a plurality of predetermined measurement items and geometric elements at a position away from the processing device 300 and the main body display unit 310.

In addition, on the second main screen sc02, the user U can perform an instruction operation of a measurement point while checking detailed information on the measurement point specified by the user U. On the other hand, on the second sub screen sc12, the user U can perform an instruction operation of a measurement point using the probe 200 at a position away from the processing device 300 and the main body display unit 310. Here, the second sub screen sc12 preferably displays physical quantities that can be calculated for one or more measurement points instructed by the user U as typical information. In the example described above, the flatness calculated by the plurality of measurement points is displayed as typical information. In this case, the user U can easily check whether there is a large error in the instruction operation of the measurement point based on the typical information displayed on the second sub screen sc12.

In addition, on the third main screen sc03, the user U can grasp much information calculated by measurement of the measurement target S as well as the measurement result based on the measurement. On the other hand, on the third sub screen sc13, the user U can grasp the measurement result at a position away from the processing device 300. Accordingly, the user U can selectively use the display units (main body display unit 310 and touch panel display 230) to be visually checked during the measurement according to the information to be preferentially grasped with respect to the measurement of the measurement target S.

In addition, on the fourth main screen sc04, the user U can select a desired geometric tolerance from all of the predetermined geometric tolerances in the three-dimensional coordinate measuring device 1. On the other hand, on the fourth sub screen sc14, the user U can select a desired geometric tolerance from some geometric tolerances of a plurality of predetermined geometric tolerances at a position away from the processing device 300 and the main body display unit 310.

In consideration of these points, when, for example, measuring the dimensions of individual portions of the measurement target S provided at a position largely away from the processing device 300, the user U can use the three-dimensional coordinate measuring device 1 as described below.

For example, the user U operates a desired element icon i02 on the first sub screen sc11 displayed on the touch panel display 230 at a position near the measurement target S. In addition, the user U instructs one or more measurement points while visually checking the second sub screen sc12. This sets a plurality of measurement target portions considered to be useful to measure the dimensions of individual portions of the measurement target S.

Then, the user U moves from the position near the measurement target S to the installation position of the processing device 300. After that, the user U operates the desired item icon i01 on the first main screen sc01 displayed on the main body display unit 310. In addition, the user U performs a selection operation of the measurement target portion and sets the design tolerance while visually checking the second main screen sc02. Accordingly, the user U can sequentially measure the dimensions of individual portions of the measurement target S based on the plurality of set measurement target portions in the state in which the probe 200 released.

In the use method described above, the user U moves between the measuring target S and the processing device 300 only when the element icon i12 corresponding to the desired geometric element is not displayed on the touch panel display 230 when selecting the geometric element. Accordingly, the user U only needs to operate the main body operation unit 320 while visually checking the first main screen sc01 and the second main screen sc02 displayed on the main body display unit 310 only when performing relatively complicated dimension measurement corresponding to the special element icon.

Figure 22:
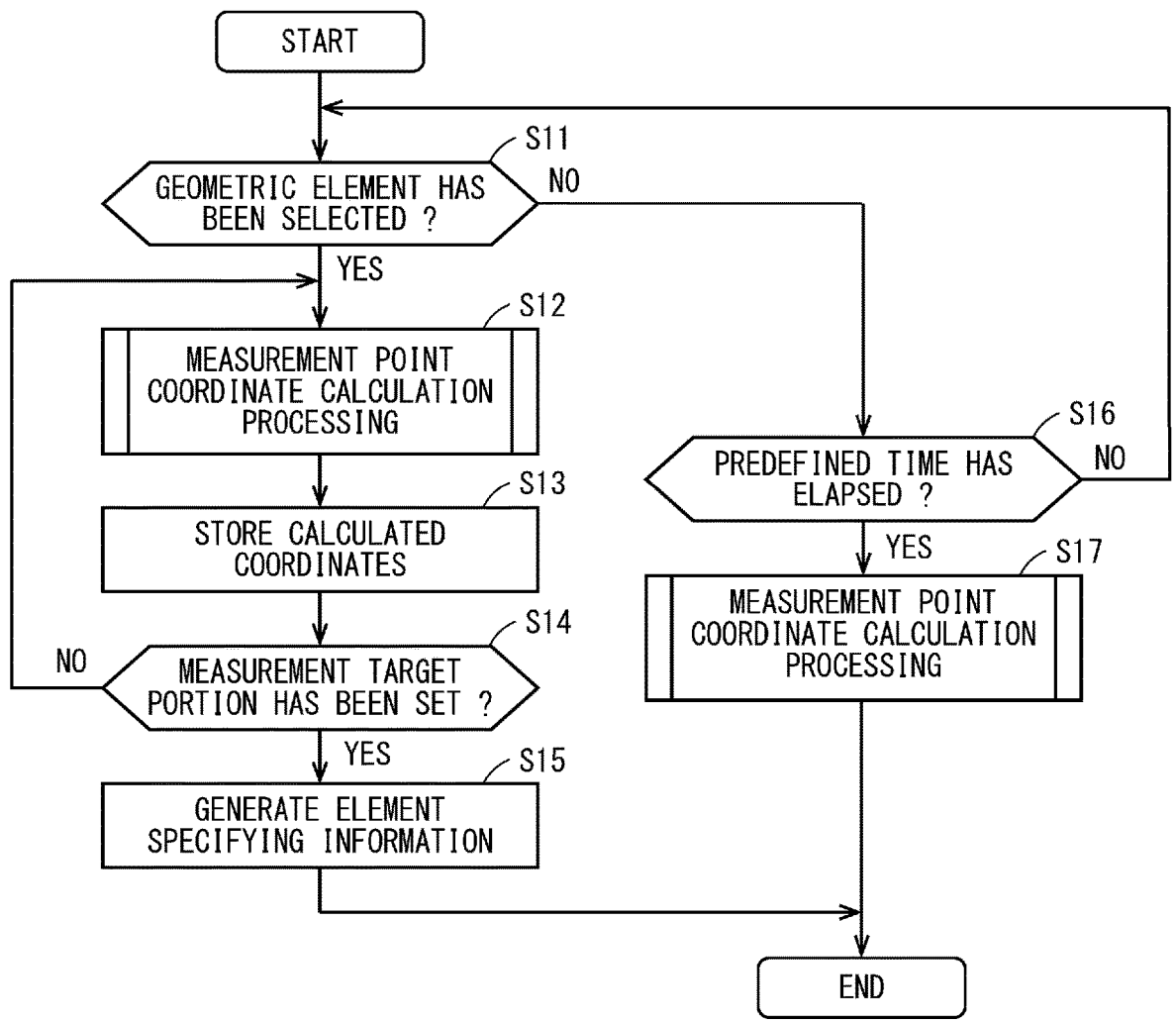
FIG. 22 is a flowchart illustrating a flow of measurement target portion setting processing by a main body control circuit in FIG. 2.

[7] Measurement Target Portion Setting Processing and Measured Value Calculation Processing FIG. 22 is a flowchart illustrating a flow of measurement target portion setting processing by the main body control circuit 302 in FIG. 2. The measurement target portion setting processing in FIG. 21 is repeated at a predetermined period by causing the CPU of the main body control circuit 302 in FIG. 2 to execute the measurement target portion setting program stored in the main body memory 303. In addition, at the start of the measurement target portion setting processing, the timer included in the main control circuit 302 is reset and then started.

First, the main body control circuit 302 decides whether the geometric element has been selected based on the presence or absence of an operation of the main body operation unit 320 in FIG. 2 or the touch panel display 230 in FIG. 8 by the user U (step S11).

When the geometric element has been selected, the main body control circuit 302 performs measurement point coordinate calculation processing (step S12). Details on measurement point coordinate calculation processing will be described later. This processing causes the main body control circuit 302 to calculate the coordinates of a measurement point for specifying the selected geometric element based on an operation of the probe 200 by the user.

In addition, the main body control circuit 302 stores, in the main body memory 303, the coordinates of the measurement point calculated by the measurement point coordinate calculation processing in step S12 (step S13).

Next, the main control circuit 302 decides whether a command to end the setting of the measurement target portion has been received (step S14). This decision is performed based on, for example, the presence or absence of an operation of the main body operation unit 320 or the touch panel display 230 by the user U. In the example described above, it is decided that a command to end the setting of the measurement target portion has been received when one of the OK buttons b03 and b13 in FIG. 19 is operated.

When the command to end the setting of the measurement target portion has not been received, the main body control circuit 302 returns to the processing in step S12 described above. In contrast, when the command to end the setting of the measurement target portion has been received, the main body control circuit 302 specifies the measurement target portion based on the selected geometric element and the coordinates of one or more measurement points and generates the element specifying information of the measurement target portion (step S15). The generated element specifying information is stored in the main body memory 303. After that, the measurement target portion setting processing ends.

When a geometric element has not been selected in step S11 described above, the main body control circuit 302 decides whether a predetermined time has elapsed after the start of the measurement target portion setting processing based on the measurement time by the built-in timer (step S16).

When the predetermined time has not elapsed, the main body control circuit 302 returns to the processing in step S11. In contrast, when the predetermined time has elapsed, the main body control circuit 302 performs the measurement point coordinate calculation processing, which will be described later, as in the processing in step S12 (step S17). After that, the main body control circuit 302 ends the measurement target portion setting processing.

It should be noted here that the processing in step S17 is performed, for example, to decide whether the probe 200 is present within the imaging visual field of the movable camera 120 or the bird's eye view camera 180 in tracking processing, which will be described later.

Figure 23:
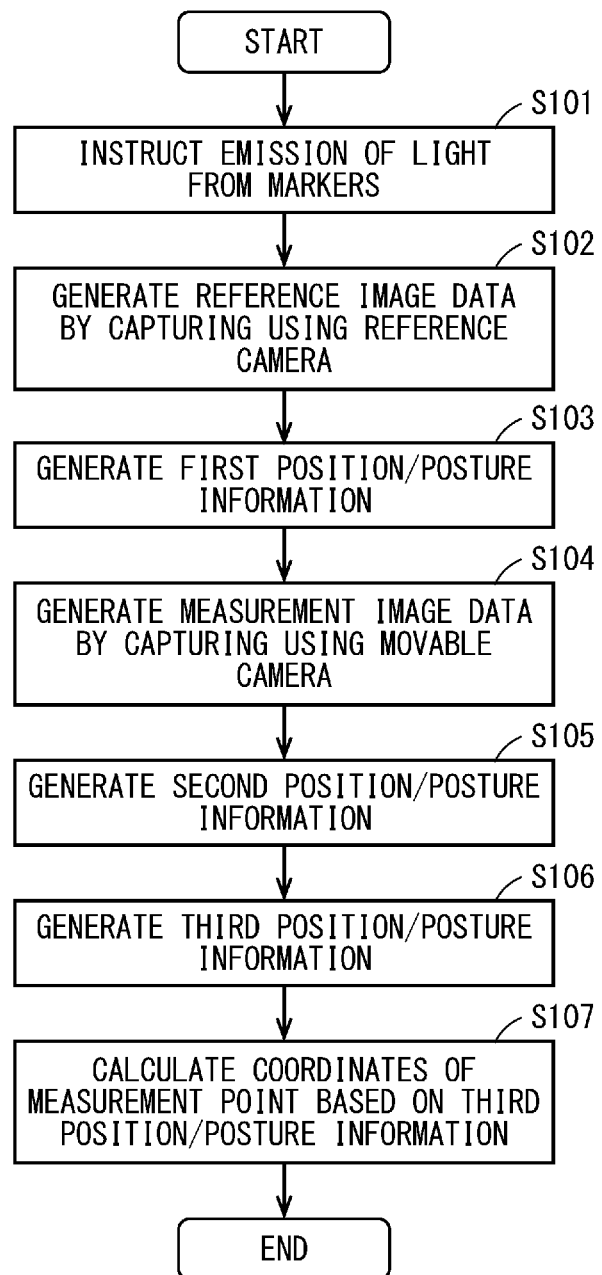
FIG. 23 is a flowchart illustrating a flow of measurement point coordinate calculation processing.

FIG. 23 is a flowchart illustrating a flow of measurement point coordinate calculation processing. First, the main body control circuit 302 instructs the probe control unit 201 of the probe 200 to emit light from the plurality of markers eq (FIG. 9) and instructs the head control circuit 150 of the imaging head 100 to emit light from the plurality of markers ep (FIG. 6B) of the reference member 190 (step S101).

Next, the main body control circuit 302 generates reference image data by causing the head control circuit 150 to capture the plurality of markers ep of the reference member 190 using the reference camera 110 (step S102). In addition, the main body control circuit 302 generates the first position/posture information indicating the position and the posture of the movable camera 120 in the device coordinate system based on the generated reference image data (step S103).

Next, the main body control circuit 302 generates measurement image data by capturing the plurality of markers eq of the probe 200 using the movable camera 120 (step S104). In addition, the main body control circuit 302 generates the second position/posture information indicating the position and the posture of the probe 200 in the movable coordinate system based on the generated measurement image data (step S105).

After that, based on the first and second position/posture information, the main body control circuit 302 generates the third position/posture information indicating the position and the posture of the probe 200 in the device coordinate system (step S106). In addition, the main body control circuit 302 calculates the coordinates of the measurement point indicated by the probe 200 based on the generated third position/posture information (step S107).

It should be noted here that the processing in step S102 and step S103 described above and the processing in step S104 and step S105 may be performed in the reverse order.

Figure 24:
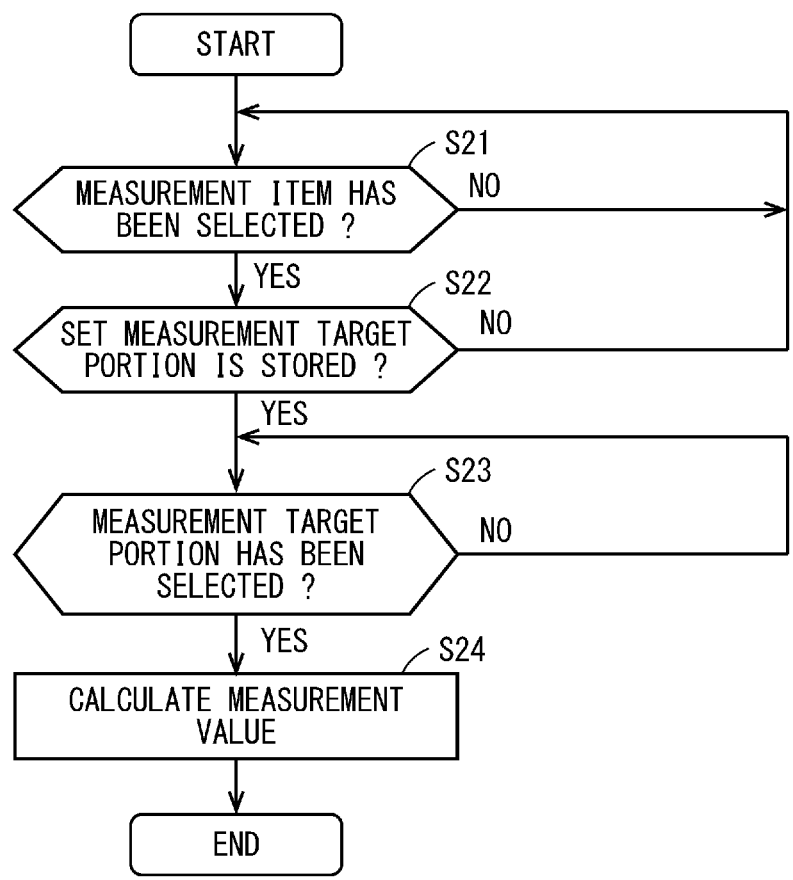
FIG. 24 is a flowchart illustrating a flow of measured value calculation processing by the main body control circuit in FIG. 2.

FIG. 24 is a flowchart illustrating a flow of measured value calculation processing by the main body control circuit 302 in FIG. 2. The measured value calculation processing in FIG. 21 is repeated at a predetermined period by causing the CPU of the main body control circuit 302 in FIG. 2 to execute the measured value calculation program stored in the main body memory 303.

First, the main control circuit 302 decides whether a measurement item has been selected based on the presence or absence of an operation of the main body operation unit 320 in FIG. 2 or the touch panel display 230 in FIG. 8 by the user U (step S21).

When a measurement item has not been selected, the main body control circuit 302 repeats the processing in step S21. In contrast, when a measurement item has been selected, the main body control circuit 302 decides whether the measurement target portions having been set at that time are present in the main body memory 303 (step S22).

When the measurement target portions having been set are not present in the main body memory 303, the main body control circuit 302 returns to the processing in step S21. In contrast, when the measurement target portions having been set are present in the main body memory 303, the main body control circuit 302 decides whether the user U has selected any of the measurement target portions having been set (step S23).

When the measurement target portion has not been selected, the main body control circuit 302 repeats the processing in step S23. In contrast, when the measurement target portion has been selected, the main body control circuit 302 calculates the measured value based on the selected measurement item and the element specifying information of the selected measurement target portion (step S24) and ends the measured value calculation processing.

According to the measurement target portion setting processing and the measured value calculation processing described above, the user U can easily measure the dimensions of a desired portion of the measurement target S by selecting a desired geometric element and measurement item from the plurality of predetermined geometric elements and the plurality of predetermined measurement items.

[8] Tracking Processing

Figure 25:
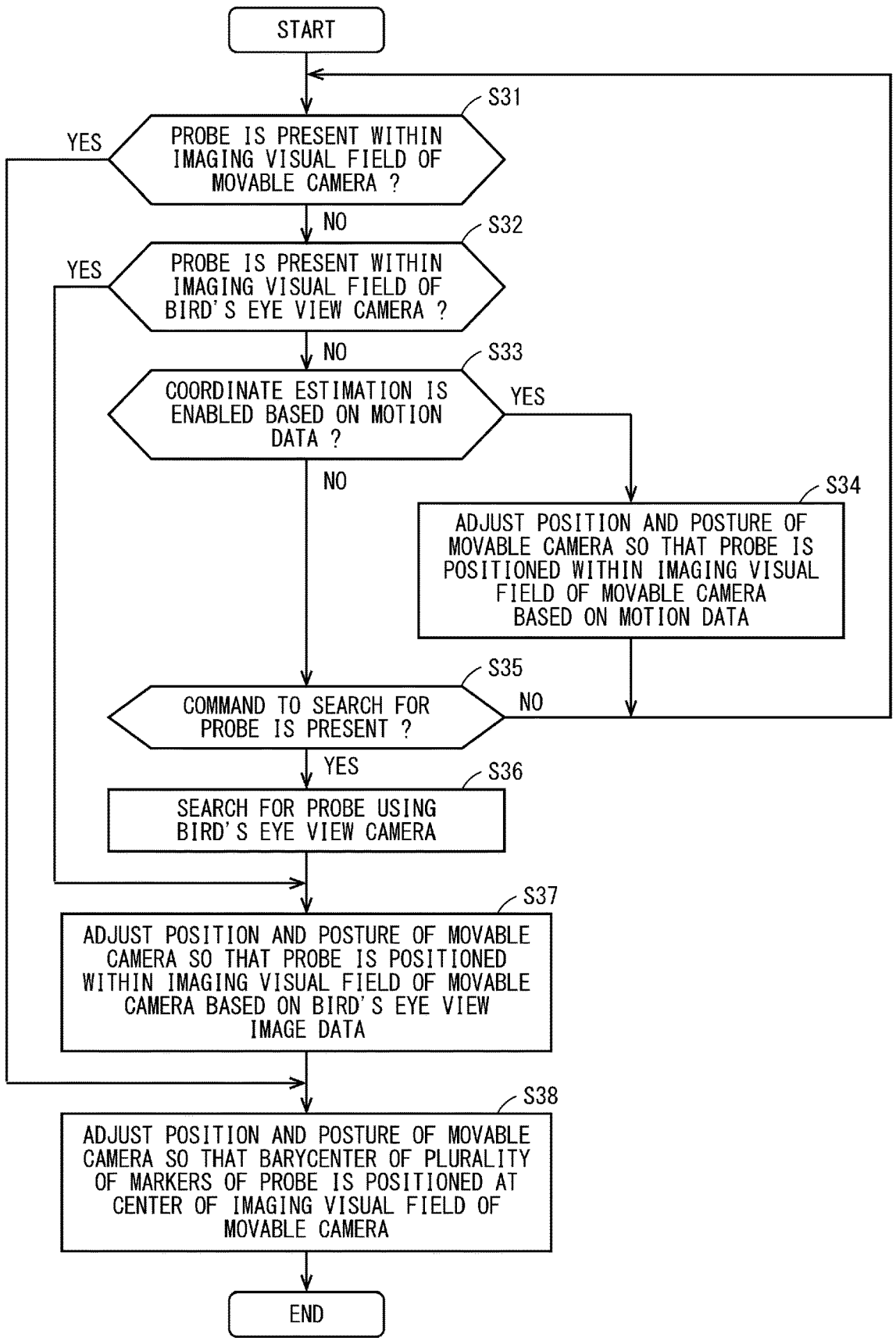
FIG. 25 is a flowchart illustrating a flow of tracking processing by the main body control circuit in FIG. 2.

FIG. 25 is a flowchart illustrating a flow of tracking processing by the main body control circuit 302 in FIG. 2. The tracking processing in FIG. 25 is repeated at a predetermined period by causing the CPU of the main body control circuit 302 in FIG. 2 to execute the tracking processing program stored in the main body memory 303.

First, the main body control circuit 302 decides whether the probe 200 is present within the imaging visual field of the movable camera 120 (step S31). This decision is performed by deciding whether the measurement image data generated during the processing in step S12 and step S17 in the measurement target portion setting processing includes the image data corresponding to the plurality of markers eq.

When the probe 200 is present within the imaging visual field of the movable camera 120, the main body control circuit 302 proceeds to the processing in step S38, which will be described later. In contrast, when the probe 200 is not present in the imaging visual field of the movable camera 120, the main body control circuit 302 decides whether the probe 200 is in the imaging visual field of the bird's eye view camera 180 (step S32). This decision is performed by deciding whether the bird's eye view image data generated during the processing in step S12 and step S17 in the measurement target portion setting processing described above includes the image data corresponding to the plurality of markers eq.

When the probe 200 is present within the imaging visual field of the bird's eye view camera 180, the main body control circuit 302 proceeds to the processing in step S37, which will be described later. In contrast, when the probe 200 is not present within the imaging visual field of the movable camera 120, the main body control circuit 302 decides whether the coordinate estimation of the probe 200 is enabled based on the motion data transferred from the probe 200 (step S33). This decision is performed based on, for example, whether the motion data indicates an abnormal value or whether the value indicated by the motion data is zero. When the motion data indicates an abnormal value or when the motion data is zero, the coordinate estimation of the probe 200 is enabled.

When the coordinate estimation of the probe 200 is enabled, the main body control circuit 302 estimates the position of the probe 200 based on the motion data. In addition, the main body control circuit 302 instructs the adjustment of the position and the posture of the movable camera 120 so that the probe 200 is positioned within the imaging visual field of the movable camera 120 (step S34). After that, the main body control circuit 302 returns to the processing in step S31.

Here, the user U can instruct the main body control circuit 302 to search for the probe 200 by operating the main body operation unit 320 in FIG. 2 or the touch panel display 230 in FIG. 8.

When the coordinate estimation of the probe 200 is disabled in step S33, the main body control circuit 302 decides whether a command to search for the probe 200 has been received (step S35). When the command to search for the probe 200 has not been received, the main body control circuit 302 returns to the processing in step S31. In contrast, when the command to search for the probe 200 has been received, the main body control circuit 302 instructs the head control circuit 150 to rotate the supporting member 30 of the imaging head 100. In this way, the main body control circuit 302 searches for the probe 200 using the bird's eye view camera 180 (step S36).

After that, when the probe 200 is positioned within the imaging visual field of the bird's eye view camera 180, the main body control circuit 302 calculates the position of the probe 200 based on the bird's eye view image data. In addition, the main body control circuit 302 instructs the head control circuit 150 to adjust the position and the posture of the movable camera 120 so that the probe 200 is positioned within the imaging visual field of the movable camera 120 (step S37).

Next, when the probe 200 is positioned within the imaging visual field of the movable camera 120, the main body control circuit 302 instructs the head control circuit 150 to adjust the position and the posture of the movable camera 120 so that the barycenter of the plurality of markers eq of the probe 200 is positioned at the center of the imaging visual field of the movable camera 120 (step S38). After that, the main body control circuit 302 ends the tracking processing.

According to the tracking process described above, even when the probe 200 moves, the imaging visual field of the movable camera 120 follows the plurality of markers eq of the probe 200. Therefore, the user U does not need to manually adjust the imaging visual field of the movable camera 120. Accordingly, the coordinates of a desired measurement point of the measurement target S can be measured over a wide range without the need for a complicated adjustment operation.

[9] Example of Use of the Probe Camera 208

An image of the measurement target S can be displayed on the main body display unit 310 in FIG. 2 by capturing the measurement target S using the probe camera 208 in FIG. 8. An image obtained by the probe camera 208 is referred to below as a captured image.

The positional relationship between the plurality of markers eq of the probe 200 and the probe camera 208 and the characteristics (angle of view, distortion, and the like) of the probe camera 208 are stored in advance as imaging information in, for example, the main body memory 303 in FIG. 2. Therefore, when the plurality of markers eq is present within the imaging visual field of the movable camera 120, the area captured by the probe camera 208 is recognized by the main body control circuit 302 in FIG. 2. That is, the three-dimensional space corresponding to the captured image is recognized by the main body control circuit 302. In this case, it is possible to superimpose the geometric element and the measurement item set at the time of measurement of the measurement target S while displaying the captured image on the main body display unit 310.

It should be noted here that the captured image may be displayed on the touch panel display 230 of the probe 200. For example, the touch panel display 230 displays a captured image obtained by capturing a portion of a certain measurement target S to be measured in advance using the probe camera 208. In this case, the user U can easily identify the portion to be measured of another measurement target S by operating the probe 200 while visually recognizing the captured image.

[10] Functional Components of Screen Display

Figure 26:
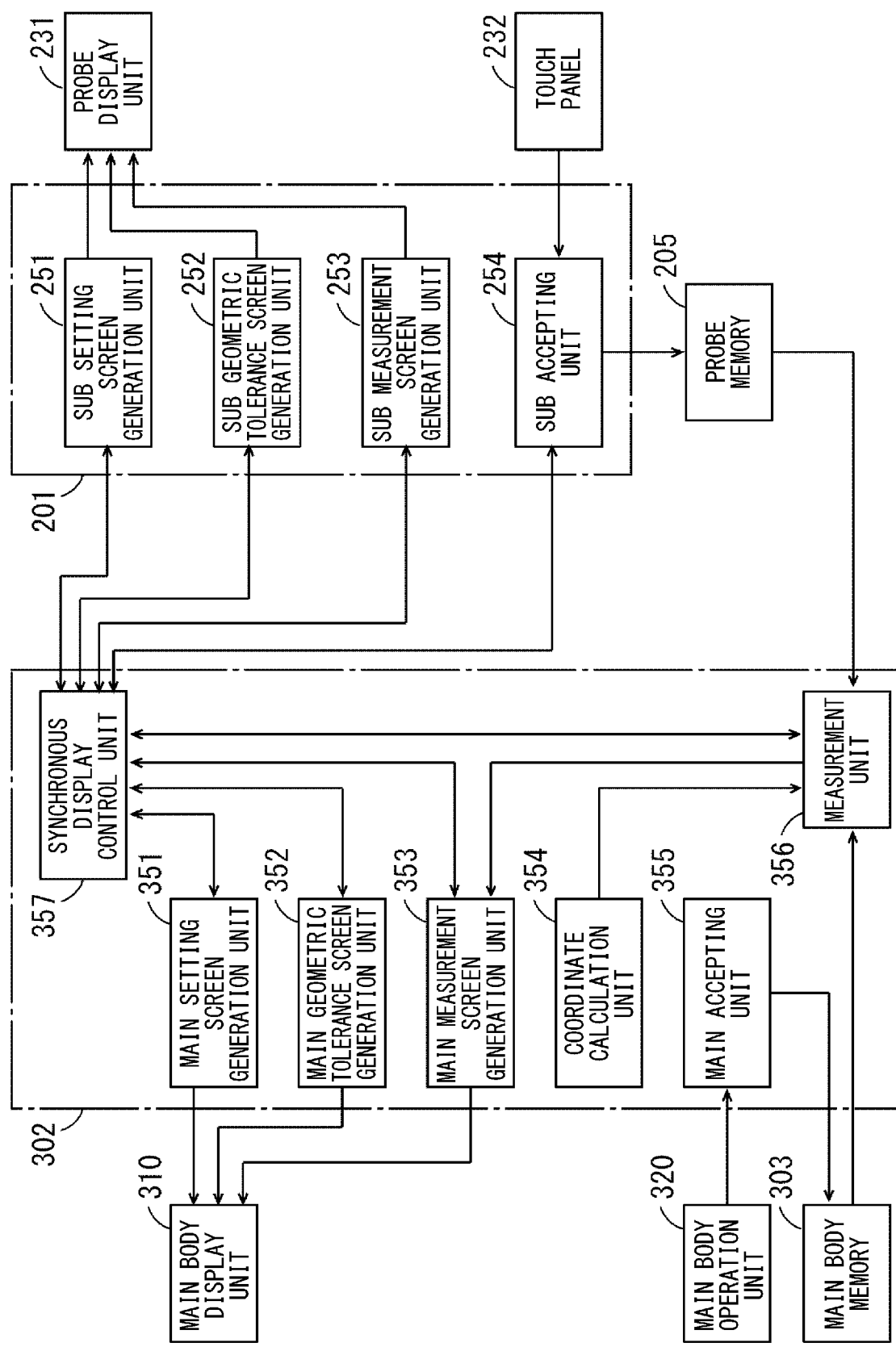
FIG. 26 is a block diagram illustrating the functional structure of mainly screen display of the three-dimensional coordinate measuring device.

FIG. 26 is a block diagram illustrating the functional components of mainly screen display of the three-dimensional coordinate measuring device 1. As illustrated in FIG. 26, the main control circuit 302 includes a main setting screen generation unit 351, a main geometric tolerance screen generation unit 352, a main measurement screen generation unit 353, a coordinate calculation unit 354, a main accepting unit 355, a measurement unit 356, and a synchronous display control unit 357 as the functional components for controlling screens displayed on the main body display unit 310 and the probe display unit 231. The structure of the functional units described above is achieved by causing the CPU of the main body control circuit 302 to execute programs concerning screen display stored in, for example, the main body memory 303. It should be noted here that a part or all of the components described above may be achieved by hardware such as electronic circuits.

The main setting screen generation unit 351 generates the screen data of the first main screen sc01 including the plurality of predetermined measurement items and the plurality of predetermined geometric elements (FIG. 18A) based on the first main screen generation data and causes the main body display unit 310 to displays the first main screen sc01. In addition, the main setting screen generation unit 351 generates the screen data of the second main screen sc02 (FIG. 19A) based on the second main screen generation data and causes the main body display unit 310 to display the second main screen sc02.

The main geometric tolerance screen generation unit 352 generates the screen data of the fourth main screen sc04 (FIG. 21A) including a plurality of predetermined geometric tolerances based on the fourth main screen generation data and causes the main body display unit 310 to display the fourth main screen sc04.

The coordinate calculation unit 354 calculates the coordinates of a measurement point on the measurement target S instructed based on an operation of the probe 200 by the user. This processing corresponds to the measurement point coordinate calculation processing in steps S12 and S17 in FIG. 22.

The main accepting unit 355 accepts the geometric element and the measurement item selected on the first main screen sc01 based on an operation of the main body operation unit 320 by the user and accepts the measurement target portion selected on the second main screen sc02. The main accepting unit 355 sets the geometric element, the measurement item, and the measurement target portion that have been accepted by storing the geometric element, the measurement item, and the measurement target portion in the main body memory 303.

In addition, the main accepting unit 355 accepts the geometric tolerance selected on the fourth main screen sc04 based on an operation of the main body operation unit 320 by the user. The main accepting unit 355 sets the geometric tolerance by storing the accepted geometric tolerance in the main body memory 303.

When the geometric element and the measurement item are selected, the measurement unit 356 calculates the value of the selected measurement item based on the geometric element and the measurement item set in the main body memory 303 or the probe memory 205 of the probe 200 and the coordinates of one or more measurement points calculated by the coordinate calculating unit 354. More specifically, the measurement unit 356 sets one or more measurement target portions based on the selected geometric element and the coordinates of the measurement point. After that, the measurement unit 356 calculates the value of the selected measurement item based on the selected measurement item and the selected set measurement target portion. This processing corresponds to the measured value calculation processing described above. In addition, when the geometric tolerance is selected, the measurement unit 356 calculates the geometric tolerance based on the coordinates of one or more measurement points calculated by the coordinate calculation unit 354 after the geometric tolerance is selected.

Here, the measurement unit 356 may calculate predetermined information when a geometric element is selected and when a measurement item is selected. For example, when "distance" is selected as the measurement item, the measurement unit 356 may further calculate components (lengths) corresponding to the three directions of the device coordinate system, respectively, with respect to the measured distance. In addition, when "plane" is selected as the geometric element, the measurement unit 356 may calculate the flatness of a plane on measurement target S specified by the plurality of measurement points and may also measure the normal vector or the like of the plane.

The main measurement screen generation unit 353 generates the screen data of the third main screen sc03 (FIG. 20A) including the measurement result of the measurement target S calculated by the measurement unit 356 based on the third main screen generation data and causes the main body display unit 310 to display the third main screen sc03. The function of the synchronous display control unit 357 will be described later.

The probe control unit 201 includes a sub setting screen generation unit 251, a sub geometric tolerance screen generation unit 252, and a sub measurement screen generation unit 253, and a sub accepting unit 254 as the functional components for controlling screens displayed on the main body display unit 310 and the probe display unit 231. The structures of the functional units described above are achieved by causing the CPU of the probe control unit 201 to execute programs concerning screen display stored in, for example, the probe memory 205. It should be noted here that a parts or all of the components described above may be achieved by hardware such as electronic circuits.

The sub setting screen generation unit 251 generates the screen data of the first sub screen sc11 (FIG. 18B) including a part of the plurality of measurement items and the plurality of geometric elements displayed on the first main screen sc01 based on the first sub screen generation data. In addition, the sub setting screen generation unit 251 causes the probe display unit 231 to display the first sub screen sc11 based on the generated screen data. In addition, the sub setting screen generation unit 251 generates the screen data of the second sub screen sc12 (FIG. 19B) based on the second sub screen generation data and causes the main body display unit 310 to display the second sub screen sc12.

The sub geometric tolerance screen generation unit 252 generates the screen data of the fourth sub screen sc14 (FIG. 21B) including a part of a plurality of geometric tolerances displayed on the fourth main screen sc04. In addition, the sub geometric tolerance screen generation unit 252 causes the probe display unit 231 to display the fourth sub screen sc14 based on the generated screen data.

The sub measurement screen generation unit 253 generates the screen data of the third sub screen sc13 (FIG. 20B) including at least a part of one or more measurement results displayed on the third main screen sc03. In addition, the sub measurement screen generation unit 253 causes the probe display unit 231 to display the third sub screen sc13 based on the generated screen data.

The sub accepting unit 254 accepts the geometric element and the measurement item selected on the first sub screen sc11 based on an operation of the touch panel 232 by the user and accepts the measurement target portion selected on the second sub screen sc12. The sub accepting unit 254 sets the geometric element, the measurement item, and the measurement target portion having been accepted by storing the geometric element, the measurement item, and the measurement target portion in the probe memory 205.

In addition, the sub accepting unit 254 accepts the geometric tolerance selected on the fourth sub screen sc14 based on an operation of the touch panel 232 by the user. The sub accepting unit 254 sets the geometric tolerance by storing the accepted geometric tolerance in the probe memory 205.

Here, when the sub accepting unit 254 accepts the geometric element, the measurement item, and the measurement target portion, the main accepting unit 355 accepts the geometric element, the measurement item, and the measurement target portion accepted by the sub accepting unit 254. In addition, when the main accepting unit 355 accepts the geometric element, the measurement item, and the measurement target portion acceptable by the sub accepting unit 254, the sub accepting unit 254 accepts the geometric element, the measurement item, and the measurement target portion accepted by the main accepting unit 355. This reduces the occurrence of differences in the accepted setting between the main accepting unit 355 and the sub accepting unit 254.

The synchronous display control unit 357 described above performs synchronous control between the main setting screen generation unit 351 and the sub setting screen generation unit 251 so as to display the first main screen sc01 on the main body display unit 310 and display the first sub screen sc11 on the probe display unit 231 (see FIGS. 18A and 18B).

In addition, the synchronous display control unit 357 performs synchronous control between the main setting screen generation unit 351 and the sub setting screen generation unit 251 so as to display the second main screen sc02 on the main body display unit 310 and display the second sub screen sc12 on the probe display unit 231 (see FIGS. 19A and 19B).

In addition, the synchronous display control unit 357 performs synchronous control between the main measurement screen generation unit 353 and the sub measurement screen generation unit 253 so as to display the third main screen sc03 on the main body display unit 310 and display the third sub screen sc13 on the probe display unit 231 (see FIGS. 20A and 20B).

In addition, the synchronous display control unit 357 performs synchronous control between the main geometric tolerance screen generation unit 352 and the sub geometric tolerance screen generation unit 252 so as to display the fourth main screen sc04 on the main body display unit 310 and display the fourth sub screen sc14 on the probe display unit 231 (see FIGS. 21A and 21B).

In this case, the user U can appropriately grasp the information corresponding to the setting work of the measurement condition and the measurement work by visually checking one of the screen displayed on the main body display unit 310 and the screen displayed on the touch panel display 230.

[11] Effects

In the three-dimensional coordinate measuring device 1 described above, the first main screen sc01 is displayed on the main body display unit 310. The first main screen sc01 includes icons (item icons i01 and element icons i02) representing a plurality of predetermined measurement items and a plurality of predetermined geometric elements, respectively. The geometric element and the measurement item corresponding to the icons selected on the first main screen sc01 are accepted by the main accepting unit 355.

In addition, the first sub screen sc11 is displayed on the touch panel display 230. The first sub screen sc11 includes icons (item icons i11 and element icons i12) representing parts of the plurality of measurement items and the plurality of geometric elements included in the first main screen sc01. The geometric element and the measurement item corresponding to the icons selected on the first sub screen sc11 are accepted by the sub accepting unit 254.

Based on the geometric element and measurement item accepted by at least one of the main accepting unit 355 and the sub accepting unit 254 and the coordinates of one or more measurement points instructed and calculated by the probe 200, the value of the selected measurement item of the selected geometric element is calculated.

According to the structure described above, the user can select a desired geometric element and measurement item from a plurality of predetermined geometric elements and measurement items on the first main screen sc01.

On the other hand, the user can select a desired geometric element and measurement item from parts of the plurality of predetermined geometric elements and measurement items on the first sub screen sc11. Here, the touch panel display 230 is provided in the probe 200 so that the user U can carry it. Accordingly, when selecting the geometric element and the measurement item displayed on the first sub screen sc11, the user U does not need to perform the specification work of measurement points by the probe 200 and the selection work of the geometric element and the measurement item at different positions. Accordingly, the setting work concerning measurement can be easily performed in a short time.

As described above, the user U can selectively use the first main screen sc01 and the first sub screen sc11 as the screen for setting of the measurement of the measurement target S according to the measurement item and the geometric element to be set. Accordingly, the three-dimensional coordinate measuring device 1 having large convenience with respect to the setting of measurement conditions can be achieved.

[12] Other Embodiments (1) In the three-dimensional coordinate measuring device 1 according to the above embodiment, the number of item icons i01 displayed on the first main screen sc01 matches the number of item icons i11 displayed on the first sub screen sc11 in the example in FIG. 18. The invention is not limited to the above example and the number of item icons i11 displayed on the first sub screen sc11 may be smaller than the number of item icons i01 displayed on the first main screen sc01. In this case, the number of element icons i12 displayed on the first sub screen sc11 may be smaller than the number of element icons i02 displayed on the first main screen sc01 or may match the number of element icons i02 displayed on the first main screen sc01. Accordingly, the total number of item icons i11 and element icons i12 displayed on the first sub screen sc11 is smaller than the sum of the plurality of predetermined item icons i01 and the plurality of predetermined element icons i02 displayed on the first main screen sc01. Therefore, the minimum setting work with the probe 200 can be performed without increasing the size of the touch panel display 230 to display a large number of icons.

(2) The touch panel display 230 is provided integrally with the probe casing 210 in the probe 200 according to the above embodiment, but the invention is not limited to this example. In the probe 200, the touch panel display 230 may be configured to be detachable from the probe casing 210. In this case, the touch panel display 230 is provided with a communication device through which signals such as screen data are exchanged with the wireless communication circuit 206 of the probe 200. In such a structure, the flexibility of an operation of the probe 200 and an operation of the touch panel display 230 by the user U is improved.

(3) The touch panel 232 is used to perform various operations on the first to fourth sub screens sc11 to sc14 in the probe 200 in the above embodiment, but the invention is not limited to this example. The probe 200 may be provided with another pointing device (such as a track ball or a joystick) for performing various operations on the screen displayed on the probe display unit 231, instead of the touch panel 232.

(4) The plurality of markers eq of the probe 200 is captured by the movable camera 120 and the plurality of markers ep of the reference member 190 is captured by the reference camera 110 to calculate the position and the posture of the probe 200 in the above embodiment, but the invention is not limited to this example.

By providing one camera having a relatively large angle of view on the reference stand 10 and capturing the plurality of markers eq of the probe 200 using this camera, the position and the posture of the probe 200 may be calculated based on the image data obtained by the capturing.

[13] Correspondence Between the Components of Claims and the Sections of the Embodiment Although an example of correspondence between the components of claims and the sections of the embodiment will be described below, the invention is not limited to the following example.

In the above embodiment, the plurality of markers eq of the probe 200 is an example of the plurality of measurement markers, the movable camera 120 is an example of the imaging unit, the first main screen sc01 displayed on the main body display unit 310 is an example of the main setting screen, the first sub screen sc11 displayed on the touch panel display 230 is an example of the sub setting screen, the probe display unit 231 of the touch panel display 230 is an example of the display unit, and the touch panel 232 of the touch panel display 230 is an example of the operation unit.

In addition, the plurality of element icons i12 displayed on the sub setting screen sc11 is an example of the one or more geometric images, the plurality of item icons i11 displayed on the sub setting screen sc11 is an example of one or more item images, the third main screen sc03 in FIG. 20A displayed on the main body display unit 310 is an example of the main measurement result screen, and the third sub screen sc13 in FIG. 20B displayed on the touch panel display 230 is an example of the sub measurement result screen.

In addition, the fourth main screen sc04 displayed on the main body display unit 310 is an example of the main geometric tolerance screen, the fourth sub screen sc14 displayed on the touch panel display 230 is an example of the sub geometric tolerance screen, the structure of the three-dimensional coordinate measuring device 1 excluding the main body display unit 310 and the main body operation unit 320 is an example of the three-dimensional coordinate measuring device, and the main body display unit 310 is an example of the external device having a display function.

As the components of the claims, other various elements having the structure or function described in the claims can also be used.

What is claimed is:

1. A three-dimensional coordinate measuring device comprising:
   a handheld probe that has a plurality of measurement markers and instructs one or more measurement points on a measurement target;
   an imaging unit that captures an image of the plurality of measurement markers of the handheld probe to generate marker image data indicating the image of the plurality of measurement markers;
   a coordinate calculation unit that calculates coordinates of the one or more measurement points instructed by the handheld probe based on the marker image data;
   a main setting screen generation unit that generates main setting screen data indicating a main setting screen including a plurality of predetermined geometric elements and a plurality of predetermined measurement items as a main setting information group to select a geometric element from the plurality of predetermined geometric elements and a measurement item from the plurality of predetermined measurement items in the main setting screen displayed on a first display;
   a main accepting unit that accepts a geometric element selected from the plurality of predetermined geometric elements and a measurement item selected from the plurality of predetermined measurement items in the main setting screen displayed on the first display based on the main setting screen data;
   a sub setting screen generation unit that generates sub setting screen data indicating a sub setting screen including a part of the main setting information group as a sub setting information group to select a geometric element from a plurality of predetermined geometric elements and a measurement item from a plurality of predetermined measurement items in the part of the main setting information group, the part of the main setting information group includes the plurality of predetermined geometric elements and the plurality of predetermined measurement items less than the main setting information group;

a display unit, distinct from the first display and coupled to the handheld probe, that displays the sub setting screen based on the generated sub setting screen data;

an operation unit that is operated by a user to select one of the geometric elements and one of the measurement items from the sub setting screen displayed in the display unit;

a sub accepting unit that accepts a geometric element selected via the operation unit from the plurality of predetermined geometric elements and a measurement item selected via the operation unit from the plurality predetermined measurement items in the part of the main setting information group in the sub setting screen displayed on the display unit; and a measurement unit operably coupled to the main accepting unit and the sub accepting unit, that calculates a value corresponding to the measurement item with respect to the geometric element specified by the one or more measurement points on the measurement target based on the geometric element and the measurement item accepted by at least one of the main accepting unit and the sub accepting unit and the coordinates of the one or more measurement points calculated by the coordinate calculation unit, wherein the handheld probe, the display unit, and the operation unit are configured to be portable.

2. The three-dimensional coordinate measuring device according to claim 1,
wherein the display unit and the operation unit are formed by a touch panel display.

3. The three-dimensional coordinate measuring device according to claim 1,
wherein the sub setting screen includes a plurality of geometric images indicating the plurality of geometric elements of the sub setting information group respectively and includes a plurality of item images indicating the plurality of measurement items of the sub setting information group respectively and
the operation unit is configured to select the geometric element and the measurement item by selection from the plurality of geometric images and the plurality of item images in the sub setting screen.

4. The three-dimensional coordinate measuring device according to claim 1,
wherein the main accepting unit accepts the geometric element and the measurement item selected on the sub setting screen in synchronization with acceptance of the geometric element and measurement item of the sub setting information group by the sub accepting unit and
the sub accepting unit accepts the geometric element and the measurement item selected on the main setting screen in synchronization with acceptance of the geometric element and measurement item of the sub setting information group by the main accepting unit.

5. The three-dimensional coordinate measuring device according to claim 1, further comprising:
a main measurement screen generation unit that generates main measurement screen data indicating a main measurement result screen including the value of the measurement item to display the value of the measurement item in the main measurement result screen displayed on the first display;

a sub measurement screen generation unit that generates sub measurement screen data indicating a sub measurement result screen including the value of the measurement item to display the value of the measurement item in the sub measurement result screen displayed on the display unit; and a synchronous display control unit that causes the first display to display the main setting screen based on the main setting screen data, causes the display unit to display the sub setting screen based on the sub setting screen data, causes the first display to display the main measurement result screen based on the main measurement screen data, and causes the display unit to display the sub measurement result screen based on the sub measurement screen data.

6. The three-dimensional coordinate measuring device according to claim 5, further comprising:
a main geometric tolerance screen generation unit that generates main geometric tolerance screen data indicating a main geometric tolerance screen including a plurality of predetermined geometric tolerances; and
a sub geometric tolerance screen generation unit that generates sub geometric tolerance screen data indicating a sub geometric tolerance screen indicating a part of the plurality of geometric tolerances,
wherein the main accepting unit is configured to accept one of the geometric tolerances that is selected on the main geometric tolerance screen displayed based on the main geometric tolerance screen data,
the sub accepting unit is configured to accept one of the geometric tolerances that is selected on the sub geometric tolerance screen displayed based on the sub geometric tolerance screen data,
the measurement unit is configured to calculate a value corresponding to the geometric tolerance with respect to the geometric element specified by the one or more measurement points on the measurement target, and
the synchronous display control unit causes the first display to display the main geometric tolerance screen based on the main geometric tolerance screen data and causes the display unit to display the sub geometric tolerance screen based on the sub geometric tolerance screen data.

7. The three-dimensional coordinate measuring device according to claim 1, further comprising:
a main measurement screen generation unit that generates main measurement screen data indicating a main measurement result screen including the value of the measurement item to display the value of the measurement item in the main measurement result screen selectively displayed on the first display; and
a sub measurement screen generation unit that generates sub measurement screen data indicating a sub measurement result screen including the value of the measurement item to display the value of the measurement item in the sub measurement result screen selectively displayed on the display unit.

8. The three-dimensional coordinate measuring device according to claim 1, further comprising:
a main geometric tolerance screen generation unit that generates main geometric tolerance screen data indicating a main geometric tolerance screen including a plurality of predetermined geometric tolerances to select a geometric tolerance from the plurality of predetermined geometric tolerances in the main geometric tolerance screen on a first display; and a sub geometric tolerance screen generation unit that generates sub geometric tolerance screen data indicating a sub geometric tolerance screen indicating a part of the plurality of geometric tolerances to select a geometric tolerance from a plurality of predetermined geometric tolerances in the part of the main geometric tolerance information group, the part of the main geometric tolerance information group includes the plurality of predetermined geometric tolerances less than the main setting information group, wherein the main accepting unit is configured to accept a geometric tolerance selected from the plurality of predetermined geometric tolerances in the main geometric tolerance screen displayed on the first display based on the main geometric tolerance screen data, the sub accepting unit is configured to accept a geometric tolerance selected via the operation unit from the plurality of predetermined geometric tolerances in the part of the main geometric tolerance information group in the sub geometric tolerance screen displayed on the display unit based on the sub geometric tolerance screen data, the measurement unit is configured to calculate a value corresponding to the geometric tolerance with respect to the geometric element specified by the one or more measurement points on the measurement target based on the geometric element and the geometric tolerance accepted by at least one of the main accepting unit and the sub accepting unit and the coordinates of the one or more measurement points calculated by the coordinate calculation unit.

9. The three-dimensional coordinate measuring device according to claim 1, wherein the probe comprises a battery and the display unit receives power provided from the battery.

* * * * *